US011470814B2

United States Patent
Goetzl et al.

(10) Patent No.: US 11,470,814 B2
(45) Date of Patent: Oct. 18, 2022

(54) PIEZOELECTRIC DETECTION COUPLING OF A BARK COLLAR

(71) Applicant: Radio Systems Corporation, Knoxville, TN (US)

(72) Inventors: Brent A. Goetzl, Knoxville, TN (US); Matthew Richardson, Knoxville, TN (US); Patrick Tyndall, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 0 days.

(21) Appl. No.: 15/871,827

(22) Filed: Jan. 15, 2018

(65) Prior Publication Data

US 2018/0132450 A1 May 17, 2018

Related U.S. Application Data

(63) Continuation-in-part of application No. 14/340,493, filed on Jul. 24, 2014, now Pat. No. 10,154,651, (Continued)

(51) Int. Cl.
*A01K 15/02* (2006.01)
*A01K 11/00* (2006.01)
*A01K 27/00* (2006.01)

(52) U.S. Cl.
CPC .......... *A01K 11/008* (2013.01); *A01K 15/021* (2013.01); *A01K 27/009* (2013.01); *A01K 27/001* (2013.01)

(58) Field of Classification Search
CPC ... A01K 15/021; A01K 15/022; A01K 27/009
See application file for complete search history.

(56) References Cited

U.S. PATENT DOCUMENTS 2,364,994 A 12/1944 Moore
2,741,224 A 4/1956 Putnam
(Continued)

FOREIGN PATENT DOCUMENTS

CN 101112181 A 1/2008
CN 101937015 A 1/2011
(Continued)

OTHER PUBLICATIONS

Baba A.I., et al., "Calibrating Time of Flight in Two Way Ranging," IEEE Xplore Digital Library, Dec. 2011, pp. 393-397.
(Continued)

*Primary Examiner* — Michael H Wang
(74) *Attorney, Agent, or Firm* — Baker, Donelson, Bearman, Caldwell & Berkowitz, PC

(57) ABSTRACT

A collar unit device is described comprising a receiving cavity for receiving a metal electrode probe, wherein at least one elastomeric ring encircles the metal electrode probe, wherein the at least one elastomeric ring mechanically isolates the metal electrode probe from the receiving cavity. The device includes a piezoelectric element. The device includes a retainer component for maintaining the piezoelectric element in a secured position, wherein the secured position comprises the piezoelectric element maintaining contact with the metal electrode probe. The device includes the metal electrode probe for detecting vibrations of one or more acoustic events and transferring the vibrations to the piezoelectric element through the contact, the piezoelectric element for receiving the vibrations of one or more acoustic events, the receiving the vibrations including generating an electrical signal proportional to the frequency and magnitude of the vibrations, and at least one processor for receiving and processing the electrical signal.

21 Claims, 28 Drawing Sheets

Related U.S. Application Data which is a continuation-in-part of application No. 13/311,129, filed on Dec. 5, 2011, now Pat. No. 8,803,692.

(60) Provisional application No. 62/543,683, filed on Aug. 10, 2017, provisional application No. 62/504,204, filed on May 10, 2017, provisional application No. 62/446,682, filed on Jan. 16, 2017, provisional application No. 61/926,797, filed on Jan. 13, 2014.

(56) References Cited

U.S. PATENT DOCUMENTS

| | | | |
|---|---|---|---|
| 3,182,211 A | | 5/1965 | Maratuech et al. |
| 3,184,730 A | | 5/1965 | Irish |
| 3,500,373 A | | 3/1970 | Arthur |
| 3,735,757 A | | 5/1973 | MacFarland |
| 4,180,013 A | | 12/1979 | Smith |
| 4,426,884 A | | 1/1984 | Polchaninoff |
| 4,783,646 A | | 11/1988 | Matsuzaki |
| 4,794,402 A | * | 12/1988 | Gonda ............ A01K 15/021 119/720 |
| 4,802,482 A | * | 2/1989 | Gonda ............ A01K 15/021 119/720 |
| 4,947,795 A | * | 8/1990 | Farkas ............ A01K 15/022 119/718 |
| 4,969,418 A | | 11/1990 | Jones |
| 5,054,428 A | * | 10/1991 | Farkus ............ A01K 15/022 119/720 |
| 5,159,580 A | | 10/1992 | Andersen et al. |
| 5,161,485 A | * | 11/1992 | McDade ........... A01K 15/021 119/720 |
| 5,182,032 A | | 1/1993 | Dickie et al. |
| 5,207,178 A | * | 5/1993 | McDade ........... A01K 27/009 119/859 |
| 5,207,179 A | | 5/1993 | Arthur et al. |
| 5,471,954 A | | 12/1995 | Gonda et al. |
| 5,526,006 A | | 6/1996 | Akahane et al. |
| 5,559,498 A | | 9/1996 | Westrick et al. |
| 5,576,972 A | | 11/1996 | Harrison |
| 5,586,521 A | | 12/1996 | Kelley |
| 5,601,054 A | * | 2/1997 | So ................. A01K 15/022 119/718 |
| 5,642,690 A | | 7/1997 | Calabrese et al. |
| 5,749,324 A | | 5/1998 | Moore |
| 5,794,569 A | | 8/1998 | Titus et al. |
| 5,810,747 A | | 9/1998 | Brudny et al. |
| 5,815,077 A | * | 9/1998 | Christiansen ....... A01K 15/021 119/712 |
| 5,844,489 A | | 12/1998 | Yarnall, Jr. et al. |
| 5,857,433 A | * | 1/1999 | Files ............... A01K 15/021 119/720 |
| 5,870,029 A | | 2/1999 | Otto et al. |
| 5,872,516 A | | 2/1999 | Bonge, Jr. |
| 5,886,669 A | | 3/1999 | Kita |
| 5,913,284 A | * | 6/1999 | Van Curen ......... A01K 15/021 119/718 |
| 5,923,254 A | | 7/1999 | Brune |
| 5,927,233 A | | 7/1999 | Mainini et al. |
| 5,933,079 A | | 8/1999 | Frink |
| 5,934,225 A | * | 8/1999 | Williams .......... A01K 27/009 119/859 |
| 5,949,350 A | | 9/1999 | Girard et al. |
| 5,957,983 A | | 9/1999 | Tominaga |
| 5,982,291 A | | 11/1999 | Williams et al. |
| 6,016,100 A | | 1/2000 | Boyd et al. |
| 6,019,066 A | * | 2/2000 | Taylor ............. G11B 31/003 119/719 |
| 6,028,531 A | | 2/2000 | Wanderlich |
| 6,047,664 A | | 4/2000 | Lyerly |
| 6,067,018 A | | 5/2000 | Skelton et al. |
| 6,075,443 A | | 6/2000 | Schepps et al. |
| 6,166,643 A | | 12/2000 | Janning et al. |
| 6,170,439 B1 | | 1/2001 | Duncan et al. |
| 6,184,790 B1 | | 2/2001 | Gerig |
| 6,196,990 B1 | | 3/2001 | Zicherman |
| 6,204,762 B1 | | 3/2001 | Dering et al. |
| 6,215,314 B1 | | 4/2001 | Frankewich, Jr. |
| 6,230,031 B1 | | 5/2001 | Barber |
| 6,230,661 B1 | | 5/2001 | Yarnall, Jr. et al. |
| 6,232,880 B1 | | 5/2001 | Anderson et al. |
| 6,271,757 B1 | | 8/2001 | Touchton et al. |
| 6,297,766 B1 | | 10/2001 | Koeller |
| 6,327,999 B1 | * | 12/2001 | Gerig ............... A01K 15/021 119/712 |
| 6,353,390 B1 | | 3/2002 | Beri et al. |
| 6,360,697 B1 | * | 3/2002 | Williams .......... A01K 15/021 119/720 |
| 6,360,698 B1 | | 3/2002 | Stapelfeld et al. |
| 6,404,338 B1 | | 6/2002 | Koslar |
| 6,415,742 B1 | | 7/2002 | Lee et al. |
| 6,426,464 B1 | | 7/2002 | Spellman et al. |
| 6,427,079 B1 | | 7/2002 | Schneider et al. |
| 6,431,121 B1 | | 8/2002 | Mainini et al. |
| 6,431,122 B1 | | 8/2002 | Westrick et al. |
| 6,441,778 B1 | | 8/2002 | Durst et al. |
| 6,459,378 B2 | | 10/2002 | Gerig |
| 6,487,992 B1 | | 12/2002 | Hollis |
| 6,561,137 B2 | | 5/2003 | Oakman |
| 6,581,546 B1 | | 6/2003 | Dalland et al. |
| 6,588,376 B1 | | 7/2003 | Groh |
| 6,598,563 B2 | | 7/2003 | Kim et al. |
| 6,600,422 B2 | | 7/2003 | Barry et al. |
| 6,637,376 B2 | | 10/2003 | Lee et al. |
| 6,657,544 B2 | | 12/2003 | Barry et al. |
| 6,668,760 B2 | | 12/2003 | Groh et al. |
| 6,700,492 B2 | | 3/2004 | Touchton et al. |
| 6,747,555 B2 | | 6/2004 | Fellenstein et al. |
| 6,798,887 B1 | | 9/2004 | Andre |
| 6,799,537 B1 | | 10/2004 | Liao |
| 6,807,720 B2 | | 10/2004 | Brune et al. |
| 6,820,025 B2 | | 11/2004 | Bachmann et al. |
| 6,825,768 B2 | | 11/2004 | Stapelfeld et al. |
| 6,830,012 B1 | * | 12/2004 | Swan ............... A01K 27/009 119/720 |
| 6,833,790 B2 | | 12/2004 | Mejia et al. |
| 6,874,447 B1 | | 4/2005 | Kobett |
| 6,888,502 B2 | | 5/2005 | Beigel et al. |
| 6,901,883 B2 | | 6/2005 | Gillis et al. |
| 6,903,682 B1 | | 6/2005 | Maddox |
| 6,907,844 B1 | | 6/2005 | Crist et al. |
| 6,907,883 B2 | | 6/2005 | Lin |
| 6,921,089 B2 | | 7/2005 | Groh et al. |
| 6,923,146 B2 | | 8/2005 | Korbitz et al. |
| 6,928,958 B2 | | 8/2005 | Crist et al. |
| 6,937,647 B1 | | 8/2005 | Boyd et al. |
| 6,956,483 B2 | | 10/2005 | Schmitt et al. |
| 6,970,090 B1 | | 11/2005 | Sciarra |
| 7,061,385 B2 | | 6/2006 | Fong et al. |
| 7,079,024 B2 | | 7/2006 | Alarcon et al. |
| 7,114,466 B1 | | 10/2006 | Mayer |
| 7,142,167 B2 | | 11/2006 | Rochelle et al. |
| 7,164,354 B1 | | 1/2007 | Panzer |
| 7,173,535 B2 | | 2/2007 | Bach et al. |
| 7,198,009 B2 | * | 4/2007 | Crist ............... A01K 15/022 119/718 |
| 7,222,589 B2 | | 5/2007 | Lee et al. |
| 7,249,572 B2 | | 7/2007 | Goetzl et al. |
| 7,252,051 B2 | * | 8/2007 | Napolez ........... A01K 15/022 119/718 |
| 7,259,718 B2 | | 8/2007 | Patterson et al. |
| 7,267,081 B2 | | 9/2007 | Steinbacher |
| 7,275,502 B2 | | 10/2007 | Boyd et al. |
| 7,296,540 B2 | | 11/2007 | Boyd |
| 7,319,397 B2 | | 1/2008 | Chung et al. |
| 7,328,671 B2 | | 2/2008 | Kates |
| 7,339,474 B2 | | 3/2008 | Easley et al. |
| 7,382,328 B2 | | 6/2008 | Lee et al. |
| 7,394,390 B2 | | 7/2008 | Gerig |
| 7,395,966 B2 | | 7/2008 | Braiman |
| 7,403,744 B2 | | 7/2008 | Bridgelall |
| 7,404,379 B2 | * | 7/2008 | Nottingham ...... A01K 27/009 119/856 |

(56) References Cited

U.S. PATENT DOCUMENTS

| | | |
|---|---|---|
| 7,411,492 B2 | 8/2008 | Greenberg et al. |
| 7,426,906 B2 | 9/2008 | Nottingham et al. |
| 7,434,541 B2 | 10/2008 | Kates |
| 7,443,298 B2 | 10/2008 | Cole et al. |
| 7,477,155 B2 | 1/2009 | Bach et al. |
| 7,503,285 B2 | 3/2009 | Mainini et al. |
| 7,518,275 B2 | 4/2009 | Suzuki et al. |
| 7,518,522 B2 | 4/2009 | So et al. |
| 7,538,679 B2 | 5/2009 | Shanks |
| 7,546,817 B2 | 6/2009 | Moore |
| 7,552,699 B2 | 6/2009 | Moore |
| 7,559,291 B2 | 7/2009 | Reinhart |
| 7,562,640 B2* | 7/2009 | Lalor ............... A01K 15/021 119/719 |
| 7,565,885 B2 | 7/2009 | Moore |
| 7,574,979 B2* | 8/2009 | Nottingham ......... A01K 27/005 119/859 |
| 7,583,931 B2 | 9/2009 | Eu et al. |
| 7,602,302 B2 | 10/2009 | Hokuf et al. |
| 7,612,668 B2 | 11/2009 | Harvey |
| 7,616,124 B2 | 11/2009 | Paessel et al. |
| 7,656,291 B2 | 2/2010 | Rochelle et al. |
| 7,658,188 B2 | 2/2010 | Rheinschmidt, Jr. et al. |
| 7,667,599 B2 | 2/2010 | Mainini et al. |
| 7,667,607 B2* | 2/2010 | Gerig ............... A01K 15/021 340/573.1 |
| 7,680,645 B2 | 3/2010 | Li et al. |
| 7,705,736 B1 | 4/2010 | Kedziora |
| 7,710,263 B2 | 5/2010 | Boyd |
| 7,760,137 B2 | 7/2010 | Martucci et al. |
| 7,779,788 B2 | 8/2010 | Moore |
| 7,786,876 B2 | 8/2010 | Troxler et al. |
| 7,804,724 B2 | 9/2010 | Way |
| 7,814,865 B2 | 10/2010 | Tracy et al. |
| 7,828,221 B2 | 11/2010 | Kwon |
| 7,830,257 B2 | 11/2010 | Hassell |
| 7,834,769 B2 | 11/2010 | Hinkle et al. |
| 7,841,301 B2 | 11/2010 | Mainini et al. |
| 7,856,947 B2 | 12/2010 | Giunta |
| 7,864,057 B2* | 1/2011 | Milnes ............... G08B 21/0288 340/573.1 |
| 7,868,912 B2 | 1/2011 | Venetianer et al. |
| 7,900,585 B2* | 3/2011 | Lee, IV ............... A01K 15/022 119/718 |
| 7,918,190 B2 | 4/2011 | Belcher et al. |
| 7,944,359 B2 | 5/2011 | Fong et al. |
| 7,946,252 B2 | 5/2011 | Lee, IV et al. |
| 7,978,078 B2 | 7/2011 | Copeland et al. |
| 7,996,983 B2 | 8/2011 | Lee et al. |
| 8,011,327 B2 | 9/2011 | Mainini et al. |
| 8,047,161 B2 | 11/2011 | Moore et al. |
| 8,049,630 B2 | 11/2011 | Chao et al. |
| 8,065,978 B2* | 11/2011 | Duncan ............... A01K 15/021 119/721 |
| 8,069,823 B2* | 12/2011 | Mainini ............... A01K 15/021 119/718 |
| 8,098,164 B2 | 1/2012 | Gerig et al. |
| 8,159,355 B2 | 4/2012 | Gerig et al. |
| 8,161,915 B2 | 4/2012 | Kim |
| 8,185,345 B2 | 5/2012 | Mainini |
| 8,232,909 B2 | 7/2012 | Kroeger et al. |
| 8,240,085 B2 | 8/2012 | Hill |
| 8,269,504 B2 | 9/2012 | Gerig |
| 8,274,396 B2 | 9/2012 | Gurley et al. |
| 8,297,233 B2 | 10/2012 | Rich et al. |
| 8,342,134 B2* | 1/2013 | Lee, IV ............... A01K 15/022 119/718 |
| 8,342,135 B2* | 1/2013 | Peinetti ............... A01K 15/023 119/721 |
| 8,430,064 B2 | 4/2013 | Groh et al. |
| 8,436,735 B2 | 5/2013 | Mainini et al. |
| 8,447,510 B2 | 5/2013 | Fitzpatrick et al. |
| 8,451,130 B2 | 5/2013 | Mainini |
| 8,456,296 B2 | 6/2013 | Piltonen et al. |
| 8,483,262 B2 | 7/2013 | Mainini et al. |
| 8,714,113 B2 | 5/2014 | Lee, IV et al. |
| 8,715,824 B2 | 5/2014 | Rawlings et al. |
| 8,736,499 B2 | 5/2014 | Goetzl et al. |
| 8,779,925 B2 | 7/2014 | Rich et al. |
| 8,803,692 B2* | 8/2014 | Goetzl ............... A01K 27/009 340/573.3 |
| 8,807,089 B2 | 8/2014 | Brown et al. |
| 8,823,513 B2 | 9/2014 | Jameson et al. |
| 8,854,215 B1 | 10/2014 | Ellis et al. |
| 8,866,605 B2 | 10/2014 | Gibson |
| 8,908,034 B2 | 12/2014 | Bordonaro |
| 8,917,172 B2 | 12/2014 | Charych |
| 8,947,240 B2 | 2/2015 | Mainini |
| 8,967,085 B2 | 3/2015 | Gillis et al. |
| 9,035,773 B2 | 5/2015 | Petersen et al. |
| 9,125,380 B2 | 9/2015 | Deutsch |
| 9,131,660 B2 | 9/2015 | Womble |
| 9,186,091 B2 | 11/2015 | Mainini et al. |
| 9,204,251 B1 | 12/2015 | Mendelson et al. |
| 9,307,745 B2 | 4/2016 | Mainini |
| 9,516,863 B2 | 12/2016 | Gerig et al. |
| 9,861,076 B2* | 1/2018 | Rochelle ............... A01K 15/023 |
| 10,514,439 B2 | 12/2019 | Seltzer |
| 10,757,672 B1 | 8/2020 | Knas et al. |
| 2002/0010390 A1 | 1/2002 | Guice et al. |
| 2002/0015094 A1 | 2/2002 | Kuwano et al. |
| 2002/0036569 A1 | 3/2002 | Martin |
| 2002/0092481 A1 | 7/2002 | Spooner |
| 2002/0103610 A1 | 8/2002 | Bachmann et al. |
| 2002/0196151 A1 | 12/2002 | Troxler |
| 2003/0034887 A1 | 2/2003 | Crabtree et al. |
| 2003/0035051 A1 | 2/2003 | Cho et al. |
| 2003/0116099 A1* | 6/2003 | Kim ............... A01K 15/021 119/719 |
| 2003/0154928 A1* | 8/2003 | Lee ............... A01K 15/022 119/712 |
| 2003/0169207 A1 | 9/2003 | Beigel et al. |
| 2003/0179140 A1 | 9/2003 | Patterson et al. |
| 2003/0218539 A1 | 11/2003 | Hight |
| 2004/0108939 A1* | 6/2004 | Giunta ............... A01K 15/023 340/572.1 |
| 2004/0162875 A1 | 8/2004 | Brown |
| 2004/0263322 A1 | 12/2004 | Onaru et al. |
| 2005/0000469 A1* | 1/2005 | Giunta ............... A01K 15/023 119/721 |
| 2005/0007251 A1 | 1/2005 | Crabtree et al. |
| 2005/0020279 A1 | 1/2005 | Markhovsky et al. |
| 2005/0035865 A1 | 2/2005 | Brennan et al. |
| 2005/0059909 A1 | 3/2005 | Burgess |
| 2005/0066912 A1 | 3/2005 | Korbitz et al. |
| 2005/0081797 A1* | 4/2005 | Laitinen ............... A01K 11/008 119/720 |
| 2005/0139169 A1 | 6/2005 | So et al. |
| 2005/0145196 A1 | 7/2005 | Crist et al. |
| 2005/0145198 A1 | 7/2005 | Crist et al. |
| 2005/0145199 A1 | 7/2005 | Napolez et al. |
| 2005/0145200 A1 | 7/2005 | Napolez et al. |
| 2005/0148346 A1 | 7/2005 | Maloney et al. |
| 2005/0172912 A1 | 8/2005 | Crist et al. |
| 2005/0217606 A1 | 10/2005 | Lee et al. |
| 2005/0231353 A1 | 10/2005 | Dipoala et al. |
| 2005/0235924 A1* | 10/2005 | Lee ............... A01K 15/022 119/718 |
| 2005/0254663 A1 | 11/2005 | Raptopoulos et al. |
| 2005/0258715 A1 | 11/2005 | Schlabach et al. |
| 2005/0263106 A1 | 12/2005 | Steinbacher |
| 2005/0280544 A1 | 12/2005 | Mishelevich |
| 2005/0280546 A1 | 12/2005 | Ganley et al. |
| 2005/0288007 A1 | 12/2005 | Benco et al. |
| 2006/0000015 A1 | 1/2006 | Duncan |
| 2006/0011145 A1 | 1/2006 | Kates et al. |
| 2006/0027185 A1 | 2/2006 | Troxler et al. |
| 2006/0037559 A1 | 2/2006 | Belcher |
| 2006/0061469 A1 | 3/2006 | Jaeger et al. |
| 2006/0092676 A1 | 5/2006 | Liptak et al. |
| 2006/0102100 A1 | 5/2006 | Becker et al. |

(56) References Cited

U.S. PATENT DOCUMENTS

| | | |
|---|---|---|
| 2006/0102101 A1* | 5/2006 | Kim .................. A01K 15/023 119/720 |
| 2006/0112901 A1 | 6/2006 | Gomez |
| 2006/0191491 A1 | 8/2006 | Nottingham et al. |
| 2006/0196445 A1 | 9/2006 | Kates |
| 2006/0197672 A1 | 9/2006 | Talamas, Jr. et al. |
| 2006/0202818 A1 | 9/2006 | Greenberg et al. |
| 2007/0011339 A1 | 1/2007 | Brown |
| 2007/0103296 A1 | 5/2007 | Paessel et al. |
| 2007/0197878 A1 | 8/2007 | Shklarski |
| 2007/0204803 A1 | 9/2007 | Ramsay |
| 2007/0204804 A1* | 9/2007 | Swanson .................. A01K 15/023 119/721 |
| 2007/0209604 A1* | 9/2007 | Groh .................. A01K 15/021 119/858 |
| 2007/0249470 A1 | 10/2007 | Niva et al. |
| 2007/0266959 A1 | 11/2007 | Brooks et al. |
| 2008/0004539 A1 | 1/2008 | Ross |
| 2008/0017133 A1 | 1/2008 | Moore |
| 2008/0036610 A1 | 2/2008 | Hokuf et al. |
| 2008/0055154 A1 | 3/2008 | Martucci et al. |
| 2008/0055155 A1 | 3/2008 | Hensley et al. |
| 2008/0058670 A1 | 3/2008 | Mainini et al. |
| 2008/0061978 A1 | 3/2008 | Huang |
| 2008/0061990 A1 | 3/2008 | Milnes et al. |
| 2008/0119757 A1 | 5/2008 | Winter |
| 2008/0129457 A1 | 6/2008 | Ritter et al. |
| 2008/0141949 A1 | 6/2008 | Taylor |
| 2008/0143516 A1 | 6/2008 | Mock et al. |
| 2008/0156277 A1 | 7/2008 | Mainini et al. |
| 2008/0163827 A1 | 7/2008 | Goetzl |
| 2008/0163829 A1 | 7/2008 | Lee et al. |
| 2008/0168949 A1 | 7/2008 | Belcher et al. |
| 2008/0168950 A1 | 7/2008 | Moore et al. |
| 2008/0186167 A1 | 8/2008 | Ramachandra |
| 2008/0186197 A1 | 8/2008 | Rochelle et al. |
| 2008/0204322 A1 | 8/2008 | Oswald et al. |
| 2008/0216766 A1 | 9/2008 | Martin et al. |
| 2008/0236514 A1 | 10/2008 | Johnson et al. |
| 2008/0252527 A1 | 10/2008 | Garcia |
| 2008/0272908 A1 | 11/2008 | Boyd |
| 2009/0000566 A1 | 1/2009 | Kim |
| 2009/0002188 A1 | 1/2009 | Greenberg |
| 2009/0012355 A1 | 1/2009 | Lin |
| 2009/0020002 A1 | 1/2009 | Williams et al. |
| 2009/0025651 A1 | 1/2009 | Lalor |
| 2009/0031966 A1 | 2/2009 | Kates |
| 2009/0061772 A1 | 3/2009 | Moon et al. |
| 2009/0082830 A1 | 3/2009 | Folkerts et al. |
| 2009/0102668 A1 | 4/2009 | Thompson et al. |
| 2009/0112284 A1 | 4/2009 | Smith et al. |
| 2009/0129338 A1 | 5/2009 | Horn et al. |
| 2009/0224909 A1 | 9/2009 | Derrick et al. |
| 2009/0239586 A1 | 9/2009 | Boeve et al. |
| 2009/0289785 A1 | 11/2009 | Leonard |
| 2009/0289844 A1 | 11/2009 | Palsgrove et al. |
| 2009/0299742 A1 | 12/2009 | Toman et al. |
| 2010/0008011 A1 | 1/2010 | Ogram |
| 2010/0019903 A1 | 1/2010 | Sawaya |
| 2010/0033339 A1 | 2/2010 | Gurley et al. |
| 2010/0047119 A1 | 2/2010 | Cressy |
| 2010/0049364 A1 | 2/2010 | Landry et al. |
| 2010/0050954 A1* | 3/2010 | Lee, IV .................. A01K 15/022 119/718 |
| 2010/0107985 A1 | 5/2010 | O'Hare |
| 2010/0139576 A1 | 6/2010 | Kim et al. |
| 2010/0154721 A1 | 6/2010 | Gerig et al. |
| 2010/0201525 A1 | 8/2010 | Bahat et al. |
| 2010/0231391 A1 | 9/2010 | Dror et al. |
| 2010/0238022 A1 | 9/2010 | Au et al. |
| 2010/0315241 A1 | 12/2010 | Jow |
| 2010/0321180 A1 | 12/2010 | Dempsey et al. |
| 2011/0140967 A1 | 6/2011 | Lopez et al. |
| 2011/0182438 A1 | 7/2011 | Koike et al. |
| 2011/0203529 A1 | 8/2011 | Mainini et al. |
| 2012/0000431 A1 | 1/2012 | Khoshkish et al. |
| 2012/0006282 A1 | 1/2012 | Kates |
| 2012/0032855 A1 | 2/2012 | Reede et al. |
| 2012/0037088 A1 | 2/2012 | Altenhofen |
| 2012/0078139 A1 | 3/2012 | Aldridge et al. |
| 2012/0087204 A1 | 4/2012 | Urbano et al. |
| 2012/0132151 A1 | 5/2012 | Touchton et al. |
| 2012/0165012 A1 | 6/2012 | Fischer et al. |
| 2012/0188370 A1 | 7/2012 | Bordonaro |
| 2012/0236688 A1 | 9/2012 | Spencer et al. |
| 2012/0312250 A1 | 12/2012 | Jesurum |
| 2013/0099920 A1 | 4/2013 | Song et al. |
| 2013/0099922 A1 | 4/2013 | Lohbihler |
| 2013/0141237 A1 | 6/2013 | Goetzl et al. |
| 2013/0157564 A1 | 6/2013 | Curtis et al. |
| 2013/0169441 A1 | 7/2013 | Wilson |
| 2013/0203027 A1 | 8/2013 | De Villers-Sidani et al. |
| 2013/0298846 A1 | 11/2013 | Mainini |
| 2013/0321159 A1 | 12/2013 | Schofield et al. |
| 2013/0340305 A1 | 12/2013 | Mobley |
| 2014/0020635 A1 | 1/2014 | Sayers et al. |
| 2014/0053788 A1 | 2/2014 | Riddell |
| 2014/0057232 A1 | 2/2014 | Wetmore et al. |
| 2014/0062695 A1 | 3/2014 | Rosen et al. |
| 2014/0069350 A1 | 3/2014 | Riddell |
| 2014/0073939 A1 | 3/2014 | Rodriguez-Llorente et al. |
| 2014/0120943 A1 | 5/2014 | Shima |
| 2014/0123912 A1 | 5/2014 | Menkes et al. |
| 2014/0132608 A1 | 5/2014 | Mund et al. |
| 2014/0174376 A1 | 6/2014 | Touchton et al. |
| 2014/0176305 A1 | 6/2014 | Aljadeff |
| 2014/0228649 A1 | 8/2014 | Rayner et al. |
| 2014/0228927 A1 | 8/2014 | Ahmad et al. |
| 2014/0253368 A1 | 9/2014 | Holder |
| 2014/0253389 A1 | 9/2014 | Beauregard |
| 2014/0261235 A1 | 9/2014 | Rich et al. |
| 2014/0267299 A1 | 9/2014 | Couse |
| 2014/0275824 A1 | 9/2014 | Couse et al. |
| 2014/0276278 A1 | 9/2014 | Smith et al. |
| 2014/0285568 A1 | 9/2014 | Crafts et al. |
| 2014/0307888 A1 | 10/2014 | Alderson et al. |
| 2014/0320347 A1 | 10/2014 | Rochelle et al. |
| 2014/0343599 A1 | 11/2014 | Smith et al. |
| 2014/0358592 A1 | 12/2014 | Wedig et al. |
| 2015/0040840 A1 | 2/2015 | Muetzel et al. |
| 2015/0043744 A1 | 2/2015 | Lagodzinski et al. |
| 2015/0053144 A1 | 2/2015 | Bianchi et al. |
| 2015/0075446 A1 | 3/2015 | Hu |
| 2015/0080013 A1 | 3/2015 | Venkatraman et al. |
| 2015/0107531 A1 | 4/2015 | Golden |
| 2015/0149111 A1 | 5/2015 | Kelly et al. |
| 2015/0163412 A1 | 6/2015 | Holley et al. |
| 2015/0172872 A1 | 6/2015 | Alsehly et al. |
| 2015/0173327 A1 | 6/2015 | Gerig et al. |
| 2015/0199490 A1 | 7/2015 | Iancu et al. |
| 2015/0223013 A1 | 8/2015 | Park et al. |
| 2015/0289111 A1 | 10/2015 | Ozkan et al. |
| 2015/0350848 A1 | 12/2015 | Eramian |
| 2015/0358768 A1 | 12/2015 | Luna et al. |
| 2016/0015005 A1 | 1/2016 | Brown, Jr. et al. |
| 2016/0021506 A1 | 1/2016 | Bonge, Jr. |
| 2016/0021850 A1 | 1/2016 | Stapelfeld et al. |
| 2016/0029466 A1 | 1/2016 | Demao et al. |
| 2016/0044444 A1 | 2/2016 | Rattner et al. |
| 2016/0084801 A1 | 3/2016 | Robinson et al. |
| 2016/0094419 A1 | 3/2016 | Peacock et al. |
| 2016/0102879 A1 | 4/2016 | Guest et al. |
| 2016/0125867 A1 | 5/2016 | Jarvinen et al. |
| 2016/0150362 A1 | 5/2016 | Shaprio et al. |
| 2016/0174099 A1 | 6/2016 | Goldfain |
| 2016/0178392 A1 | 6/2016 | Goldfain |
| 2016/0187454 A1 | 6/2016 | Orman et al. |
| 2016/0234649 A1 | 8/2016 | Finnerty et al. |
| 2016/0253987 A1 | 9/2016 | Chattell |
| 2016/0292635 A1 | 10/2016 | Todasco |
| 2016/0335917 A1 | 11/2016 | Lydecker et al. |
| 2016/0363664 A1 | 12/2016 | Mindell et al. |
| 2016/0366813 A1 | 12/2016 | Haneda et al. |
| 2017/0026798 A1 | 1/2017 | Prevatt |

(56) References Cited

U.S. PATENT DOCUMENTS

| | | |
|---|---|---|
| 2017/0212205 A1 | 7/2017 | Bialer et al. |
| 2017/0323630 A1 | 11/2017 | Stickney et al. |
| 2018/0027772 A1 | 2/2018 | Gordon et al. |
| 2018/0077509 A1 | 3/2018 | Jones et al. |
| 2018/0078735 A1 | 3/2018 | Dalgleish et al. |
| 2018/0094451 A1 | 4/2018 | Peter et al. |
| 2018/0188351 A1 | 7/2018 | Jones et al. |
| 2018/0190311 A1 | 7/2018 | Kato et al. |
| 2018/0210704 A1 | 7/2018 | Jones et al. |
| 2018/0234134 A1 | 8/2018 | Tang et al. |
| 2018/0235182 A1 | 8/2018 | Bocknek |
| 2018/0249680 A1 | 9/2018 | Van Curen et al. |
| 2018/0303066 A1 | 10/2018 | Weimin et al. |
| 2018/0315262 A1 | 11/2018 | Love et al. |
| 2019/0013003 A1 | 1/2019 | Baughman et al. |
| 2019/0066651 A1 | 2/2019 | Yang |
| 2019/0110430 A1 | 4/2019 | Badiou |
| 2019/0165832 A1 | 5/2019 | Khanduri et al. |
| 2020/0367810 A1 | 11/2020 | Shouldice et al. |

FOREIGN PATENT DOCUMENTS

| | | |
|---|---|---|
| CN | 101112181 B | 11/2012 |
| CN | 102793568 B | 12/2014 |
| JP | H0974774 A | 3/1997 |
| KR | 20130128704 A | 11/2013 |
| KR | 20180059684 A | 6/2018 |
| KR | 101911312 B1 | 1/2019 |
| WO | WO-02060240 A3 | 2/2003 |
| WO | WO-2006000015 A1 | 1/2006 |
| WO | WO-2008085812 A2 | 7/2008 |
| WO | WO-2008140992 A1 | 11/2008 |
| WO | WO-2009105243 A2 | 8/2009 |
| WO | WO-2009106896 A2 | 9/2009 |
| WO | WO-2011055004 A1 | 5/2011 |
| WO | WO-2011136816 A1 | 11/2011 |
| WO | WO-2011160698 A1 | 12/2011 |
| WO | WO-2012122607 A1 | 9/2012 |
| WO | WO-2015015047 A1 | 2/2015 |
| WO | WO-2016204799 A1 | 12/2016 |

OTHER PUBLICATIONS

Extended European Search Report for European Application No. 11784149.4 dated Nov. 17, 2017, 7 pages.
Extended European Search Report for European Application No. 15735439.0 dated Oct. 18, 2017, 9 pages.
Extended European Search Report for European Application No. 15895839.7 dated Oct. 9, 2018, 5 pages.
Extended European Search Report for European Application No. 17162289.7 dated Aug. 31, 2017, 7 pages.
High Tech Products, Inc: "Human Contain Model X-10 Rechargeable Muti-function Electronic Dog Fence Ultra-system", Internet citation, Retrieved from the Internet: URL:http://web.archive.org/web/20120112221915/http://hightechpet.com/user_Manuals/HC%20X-10_Press.pdf retrieved on Apr. 10, 2017], Apr. 28, 2012, pp. 1-32, XP008184171.
International Preliminary Report for Patentability Chapter II for International Application No. PCT/US2014/024875 dated Mar. 12, 2015, 17 pages.
International Preliminary Reporton Patentability for Application No. PCT/US2015/043653 dated Dec. 19, 2017, 14 pages.
International Search Report and Written Opinion for Application No. PCT/US2018/013737 dated Mar. 7, 2018, 8 pages.
International Search Report and Written Opinion for Application No. PCT/US2018/013738 dated Mar. 20, 2018, 6 pages.
International Search Report and Written Opinion for Application No. PCT/US2018/013740 dated Mar. 20, 2018, 6 pages.
International Search Report and Written Opinion for Application No. PCT/US2018/019887 dated May 8, 2018, 10 pages.
International Search Report and Written Opinion for International Application No. PCT/US2014/024875 dated Jun. 27, 2014, 12 pages.
International Search Report for International Application No. PCT/US2014/020344 dated Jun. 5, 2014, 2 pages.
International Search Report for International Application No. PCT/US2014/066650 dated Feb. 19, 2015, 3 pages (Outgoing).
International Search Report for International Application No. PCT/US2015/010864, Form PCT/ISA/210 dated Apr. 13, 2015, 2 pages.
International Search Report for International Application No. PCT/US2015/043653, Form PCT/ISA/210 dated Oct. 23, 2015, 2 pages.
Notification of Transmittal of the International Search Report and the Written Opinion of the International Searching Authority for International Application No. PCT/US2015/043653, Form PCT/ISA/220 dated Oct. 23, 2015, 1 page.
Notification of Transmittal of the International Search Report and Written Opinion for the International Application No. PCT/US2014/066650 dated Feb. 19, 2015, 1 page.
Extended European Search Report for Application No. EP17180645, dated May 9, 2018, 5 pages.
Welch et al., "An Introduction to the Kalman Filter," Department of Computer Science, Jul. 24, 2006, pp. 1-16.
Written Opinion for International Application No. PCT/US2014/066650 dated Feb. 19, 2015, 15 pages(outgoing).
Written Opinion for International Application No. PCT/US2015/043653, Form PCT/ISA/237 dated Oct. 23, 2015, 13 pages.
Written Opinion of the International Application No. PCT/US2015/010864, Form PCT/ISA/237 dated Apr. 13, 2015, 6 pages.
Eileen—How To Protect Your Dog From Loud and Scary Sounds (Year: 2013).
Extended European Search Report for European Application No. 18738816, dated Sep. 29, 2020, 10 pages.
Extended European Search Report for European Application No. 18738547.1, dated Sep. 24, 2020, 9 pages.
Extended European Search Report for European Application No. 18738743.6, dated Sep. 24, 2020, 11 pages.
Info Unlimited "Canine 10RC-HP10 Instructions," Instruction manual V.0420; Publication 12 & 15 [online], Jun. 14, 2013 [retrieved Sep. 29, 2020], Retrieved from the Internet: URL: https://www.amazing1.com/content/download/CANINE10_Instructions.pdf, 18 pages.
Info Unlimited "Canine 10RC-HP10 Instructions," Instruction manual V.0420; [Retrieved on Jul. 8, 2017], Retrieved from the Internet: URL: https://www.amazing1.com/content/download/CANINE10_Instructions.pdf, 18 pages.
International Search Report and Written Opinion for Application No. PCT/US2020/042601, dated Nov. 9, 2020, 11 pages.
International Search Report and Written Opinion for Application No. PCT/US2018/065122, dated Mar. 25, 2019, 7 pages.
International Search Report and Written Opinion for Application No. PCT/US2018/065154, dated Apr. 23, 2019, 7 pages.
International Search Report and Written Opinion for Application No. PCT/US2018/065938, dated Mar. 8, 2019, 9 pages.
International Search Report and Written Opinion for Application No. PCT/US2020/016617, dated Apr. 27, 2020, 13 pages.
Jondhale S. R., et al., "Issues and Challenges in RSSI Based Target Localization and Tracking in Wireless Sensor Networks," International Conference on Automatic Control and Dynamic Optimization Techniques (ICACDOT), 2016, pp. 594-598.
Joshi A., et al. "GPS-less Animal Tracking System," Fourth International Conference on Wireless Communication and Sensor Networks, 2008, pp. 120-125.
Kuo S., et al., "Detecting Movement of Beacons in Location-Tracking Wireless Sensor Networks," IEEE 66th Vehicular Technology Conference, 2007, pp. 362-366.
Kuo S., et al., "The Beacon Movement Detection Problem in Wireless Sensor Networks for Localization Applications," IEEE Transactions on Mobile Computing, Oct. 2009, vol. 8(10), pp. 1326-1338.
Millner H., et al., "Wireless 3D Localization of Animals for Trait and Behavior Analysis in Indoor & Outdoor Areas," IEEE MTT-S International Microwave Workshop on Wireless Sensing, Local Positioning, and RFID, 2009, pp. 1-4.

(56) References Cited

OTHER PUBLICATIONS

Panicker, G. J., et al., "A LoRa Wireless Mesh Network for Wide-Area Animal Tracking," IEEE International Conference on Electrical, Computer and Communication Technologies, 2019, pp. 1-5.
Supplementary European Search Report for European Application No. 18887374.9, dated Aug. 10, 2021, 7 pages.
Supplementary European Search Report for European Application No. 18888089.2, dated Aug. 6, 2021, 6 pages.
Supplementary European Search Report for European Application No. 18889799.5, dated Aug. 13, 2021, 10 pages.
Ayele E., et al., "Highly Energy Efficient Animal Mobility Driven BLE Beacon Advertising Control for Wildlife Monitoring," IEEE Xplore, 2020, 8 pages.
Crutchfield., "What You Need to Know About Sound Masking," 2021, pp. 1-7.
Integrated Building System., "The What, Where, Why and How of Sound Masking," 2016, 6 pages.
Nam M., et al., "Combined Scheduling of Sensing and Communication for Real-Time Indoor Tracking in Assisted Living," IEEE Real Time System Symposium, 2007, 10 pages.
Radoi I.E., et al., "Tracking and Monitoring Horses in the Wild Using Wireless Sensor Networks," IEEE International Conference on Wireless and Mobile Computing, Networking and Communications, 2015, 8 pages.
Wood D.J., "Speech Privacy & Sound Masking in Modern Architecture," 2008, 51 pages.

\* cited by examiner

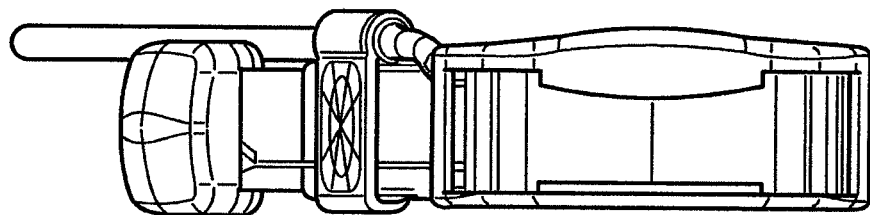
FIG. 27
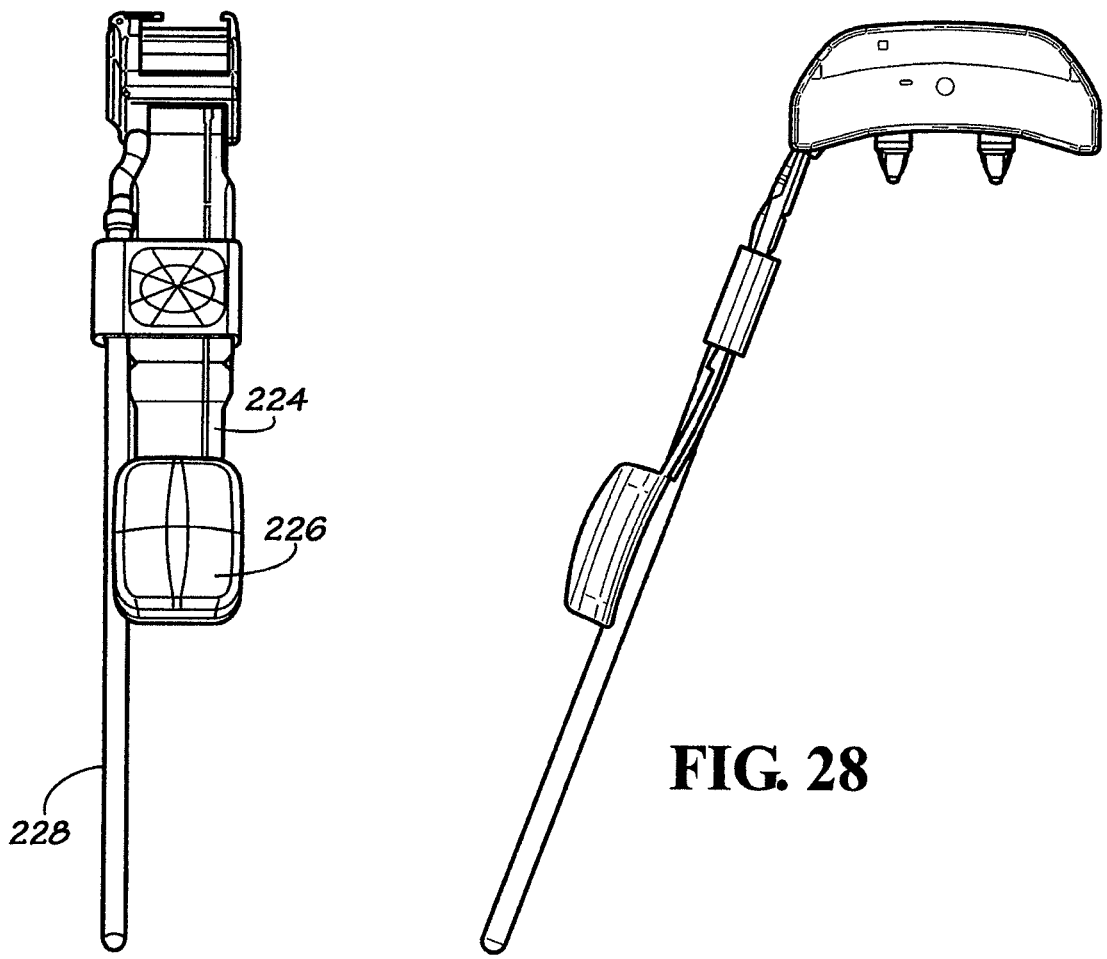
FIG. 26
FIG. 28

PIEZOELECTRIC DETECTION COUPLING OF A BARK COLLAR

CROSS REFERENCE TO RELATED APPLICATIONS

This application is filed as continuation-in-part of U.S. patent application Ser. No. 14/340,493, filed Jul. 24, 2014, which claims the benefit of U.S. patent application Ser. No. 61/926,797, filed Jan. 13, 2014, and which is also a continuation-in-part of U.S. patent application Ser. No. 13/311,129, filed on Dec. 5, 2011.

This application claims the benefit of U.S. patent application Ser. No. 62/543,683, filed Aug. 10, 2017.

This application claims the benefit of U.S. patent application Ser. No. 62/504,204, filed May 10, 2017

This application claims the benefit of U.S. patent application Ser. No. 62/446,682, filed Jan. 16, 2017.

Each patent, patent application, and/or publication mentioned in this specification is herein incorporated by reference in its entirety to the same extent as if each individual patent, patent application, and/or publication was specifically and individually indicated to be incorporated by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

The disclosure herein is directed to stimulation devices that deliver stimulation to animals in the form of shock, sound, vibration or spray to correct any of a variety of behaviors. The disclosure herein is also directed to real time animal location and tracking systems.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

FIG. 17 is intended to be a more complete showing of the modular dog collar of FIG. 6.

FIG. 26 is a side view of the integrated GPS tracking/E-collar system coupled to GPS and radio antennae, under an embodiment.

FIG. 27 is a top view of the integrated GPS tracking/E-collar system coupled to GPS and radio antennae, under an embodiment.

FIG. 28 is a front view of the integrated GPS tracking/E-collar system coupled to GPS and radio antennae, under an embodiment.

FIG. 31 also shows a decoupled E-collar unit next to the system, under an embodiment.

FIG. 32 also shows a decoupled E-collar unit next to the system, under an embodiment.

FIG. 33 also shows a decoupled E-collar unit next to the system, under an embodiment.

DETAILED DESCRIPTION OF CERTAIN EMBODIMENTS

Definitions

Figure 1:
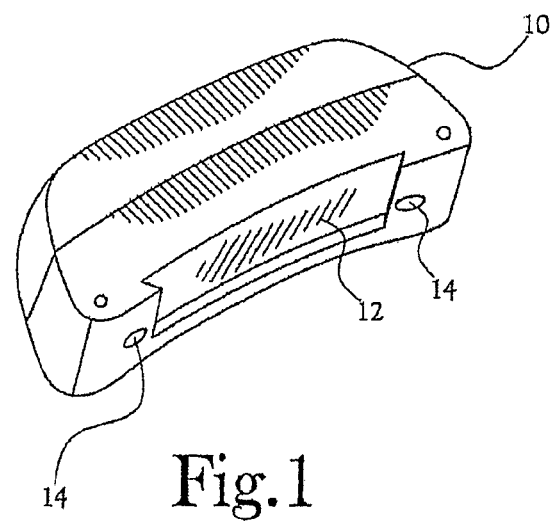
FIG. 1 is a perspective view of an animal tracking unit as may be used in the modular dog collar of the present invention, in one embodiment. The illustrative tracking unit includes a receiving portion.

For purposes of the present disclosure, it is noted that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Description of Selected Specific Embodiments

Various embodiments of the present general inventive concept, as described herein, provide an animal tracking and control apparatus having a tracking unit to track an animal, and a stimulus unit to provide a stimulus to the animal. The tracking unit and stimulus unit are configured to be removably coupled together. In other words, the tracking unit and stimulus unit are formed such that the two units are able to be docked together. The coupling of the two units as modules may be referred to interchangeably throughout this description as docking.

The tracking unit and stimulus unit may transmit and/or receive signals to/from a common control device. In the various embodiments described herein, the control device is described as a remote handheld control device, or more simply a handheld transceiver. The single handheld transceiver communicates with both the stimulus unit and the tracking unit, and may send/receive signals to/from the units using different channels or different ID codes. Also, it is understood that the control device is not limited to any ornamental features shown in the handheld transceiver described in the drawings.

The animal tracking and control apparatus may be provided to any animal, but is typically described herein as being provided to a dog. For example, the animal tracking and control apparatus may be secured to an animal encircling device such as a dog collar which is worn by a dog, in order to track the dog's movements and provide a control stimulus to the dog. This is merely one non-limiting example of how the animal tracking and control apparatus may be utilized.

In an example embodiment in which the animal tracking and control apparatus is secured to the animal by an animal encircling device, such as a dog collar, either the tracking unit or the stimulus unit may be secured to the dog collar, and the other of the tracking unit or the stimulus unit is removably coupled to the unit secured to the dog collar. As an example, if the tracking unit is secured to the dog collar, the stimulus unit may be removed so that only the tracking unit is provided to the dog wearing the dog collar. Further, the animal tracking module may be provided with a cover to be removably coupled to the tracking module in lieu of the stimulus unit being in a coupled configuration.

In the examples illustrated and discussed throughout this description in which the animal tracking and control apparatus is secured to an animal encircling device such as a dog collar, the tracking unit is described as being secured to the dog collar. The dog collar is secured to the tracking unit by securing members such as screws, a molded collar that is permanently fastened to the tracking unit, a pass through woven collar, an attached woven collar, or a pass through molded collar.

The animal tracking unit may operate similarly to a typical Global Navigation Satellite System (GNSS) device. Various GNSS tracking systems, which employ GNSS systems such as the Global Positioning System (GPS) of the United States, the Russian GLONASS, etc., have been typically used to monitor the movement of a mobile subject such as an animal, often relative to a selected containment area. In such systems, the position and speed of the animal are monitored through the use of the GNSS satellites, and the position and speed of the animal may be displayed on a monitoring device. If a containment area is also employed, the containment area may also be displayed on the monitoring device.

The animal stimulus unit may operate similarly to various animal control apparatuses. For instance, the animal stimulus unit may provide the animal with various stimuli such as vibrations, sound or spray. Further, these various stimuli may be selectively provided to the animal, and the levels of the various stimuli may be adjusted. For example, a vibration provided to a dog to control a certain behavior may be increased if the dog does not respond to the previously used level of vibration stimulus. The animal stimulus unit may be provided with one or more protrusions to extend toward the animal's skin to make contact through the coat.

The previously described control device may be a handheld transceiver which sends/receives signals to/from the animal tracking module and stimulus module, and may have a display such as a graphic user interface (GUI) which may show the location of one or more animals equipped with the tracking module.

The handheld transceiver may have a plurality of controls to allow various operations such as switching the display emphasis between various hunting dogs being tracked and providing various stimuli levels to different dogs. The handheld transceiver may communicate with the tracking module using a different channel than the one used to communicate with the stimulus module.

Thus, an integrated animal tracking and control system provides a user or owner with an animal tracking or animal tracking/training system that can be user configured. In any of a number of example configurations, there is only one collar (or other animal encircling device) mounted device which is provided to the animal, and only one remote handheld control unit. The collar mounted device may under one embodiment include both the tracking unit and the stimulus unit in a configuration in which those units are docked together, and includes only one of the units in a configuration in which the units are not docked together. Such an apparatus and system greatly simplifies the mounting and operation of an animal training and/or tracking system. Such an apparatus and system also allows the sporting competitor to readily remove the training module for competition.

FIG. 1 is a perspective view of an animal tracking unit 10 as may be used in the modular dog collar of the present invention, in one embodiment. The illustrative tracking unit includes a receiving portion. The tracking unit 10 may receive GNSS signals and transmit position signals to a control device. In this example embodiment, the tracking unit 10 is provided with receiving portion 12 configured to receive a stimulus unit (see FIG. 2, 20) to be removably coupled to the tracking unit 10. In this example, the receiving portion is configured so as to form a dovetail connection with the coupled stimulus unit 20. It is understood that the dovetail connection is merely one configuration by which the tracking unit 10 will be docked with the coupled stimulus unit 20.

The tracking unit 10 of this example embodiment is also provided with holes 14 to receive screws to further secure the coupled stimulus unit 20 to the tracking unit 10. Although screws are described in this example embodiment, any type of adhesion member, such as bolts, brackets, clamps, and so on, may be used to further secure the coupled, or docked, units. Also, in other example embodiments, no adhesion members may be used to further secure the docking of the units. It is understood that the shape and dimensions of the tracking unit 10, as well as the other example units illustrated in the following drawings, are merely simple examples for illustrative purposes, and corresponding units in various embodiments of the present general inventive concept may vary widely in size, shape, composition, and so on.

The tracking unit 10 may further be provided with an antenna 60 (as described later in FIG. 6) or antennas (not shown) to transmit/receive GPS signals and/or signals to the control device. The antenna(s) may be integrated with an animal encircling device to which the tracking unit 10 is secured.

Figure 2:
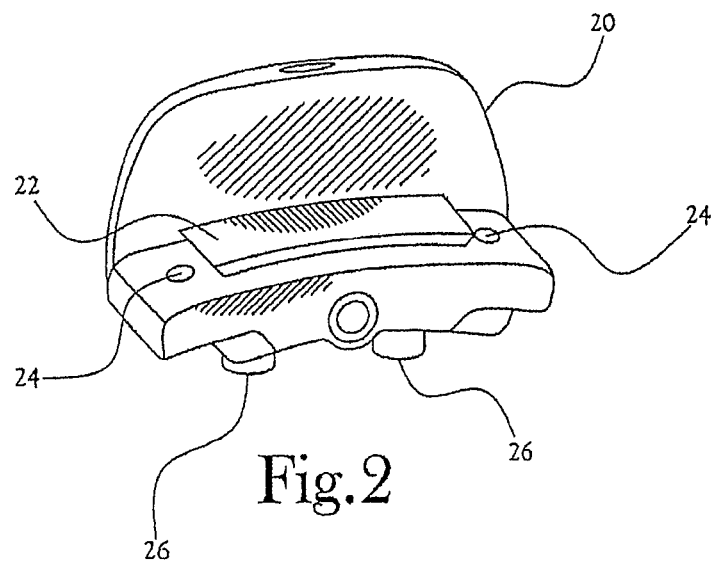
FIG. 2 is a perspective view of an animal stimulus unit as may be used in the modular dog collar of the present invention, in one embodiment. The illustrative stimulus unit includes an extending portion configured to engage the receiving portion of the animal tracking unit.

FIG. 2 is a perspective view of an animal stimulus unit 20 as may be used in the modular dog collar of the present invention, in one embodiment. The illustrative stimulus unit includes an extending portion configured to engage the receiving portion of the animal tracking unit. The stimulus unit 20 may receive control signals from the control device which also communicates with the tracking unit 10 in order to provide a stimulus to the animal. In this example embodiment the stimulus unit is provided with an extending portion 22 configured to slide into the receiving portion 12 of the tracking unit 10 in order to dock the stimulus unit 20 to the tracking unit 10 with a dovetail connection. It is understood that either of the tracking unit 10 or the stimulus unit 20 may be provided with the receiving portion 12, with the remaining one of the tracking unit 10 or the stimulus unit 20 being provided with the extending portion 22. Also, the coupling of the units may be achieved through configurations other than a receiving portion receiving an extending portion, and/or other than a slidable connection as illustrated in these drawings.

The stimulus unit 20 of this example embodiment is provided with through holes 24 through which screws may pass to further secure the docking of the tracking unit 10 and the stimulus unit 20. The screws, or other adhesion members, pass through the through holes 24 to the holes 14 of the tracking unit 10.

The stimulus unit 20 of this example embodiment is also provided with protrusions 26 which extend from the stimulus unit 20 to contact the skin of an animal and provide a stimulus, such as a vibration. The level of the stimulus may be adjusted through the control device communicating with the stimulus unit 20. The stimulus unit 20 may further have an antenna (not shown) to be used in transmitting and/or receiving control signals from the control device. It is understood that the protrusions 26 are merely an example of how the stimulus may be delivered to the animal.

Figure 3:
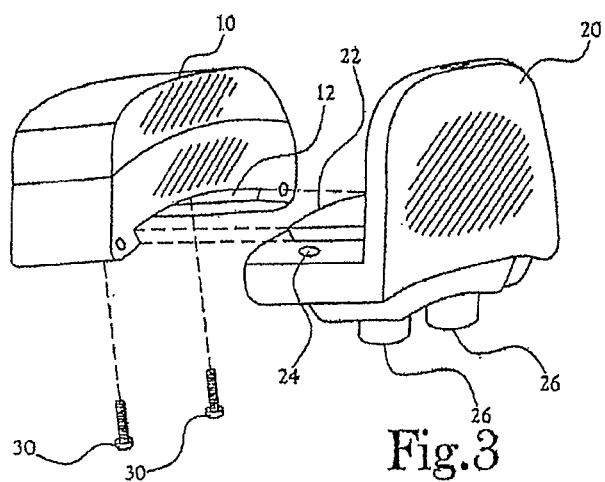
FIG. 3 is a perspective view of the animal tracking unit and animal stimulus unit from FIGS. 1 and 2. Here, the animal tracking unit of FIG. 1 and the stimulus unit of FIG. 2 are seen in exploded apart relation.

FIG. 3 is a perspective view of the animal tracking unit 10 and animal stimulus unit 20 from FIGS. 1 and 2. Here, the animal tracking unit of FIG. 1 and the stimulus unit of FIG. 2 are seen in exploded apart relation. As illustrated, the extending portion 22 of the stimulus unit 20 slides into the receiving portion 12 of the tracking unit 10 to form a dovetail connection. After the docking is achieved, screws 30 may be screwed into the holes 14 of the tracking unit 10 through the through holes 24 of the stimulus unit 20 in order to further secure the docking of the units.

Although not illustrated in these drawings, each of the tracking unit 10 and the stimulus unit 20 may be provided with on/off buttons, on/off indicators, charging jacks, and other similar features typically provided to electric/electronic devices. Also, the stimulus unit 20 may be provided with an internal or external antenna to be used in communication with the control device, and the tracking unit 10 may be provided with one or more internal and/or external antennas to be used in communication with the control device and/or GNSS satellites. One or more of the various antennas may be integrated with or supported by an animal encircling device to which the animal tracking and control apparatus is attached. These features have largely been omitted from the drawings to present a more clear illustration of the docking feature of the units.

Figure 4:
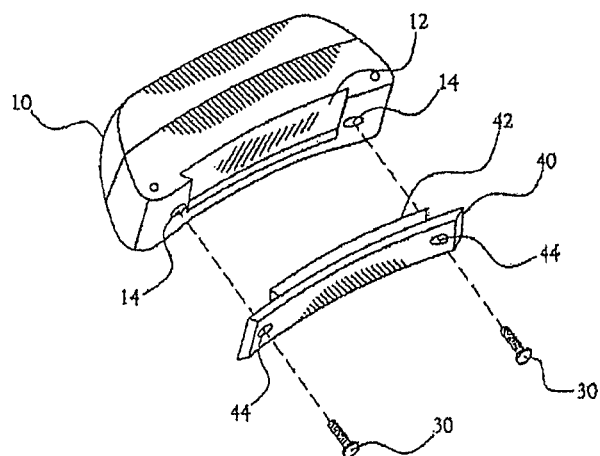
FIG. 4 is a perspective view of the animal tracking unit of FIG. 1. Here, the tracking unit is ready to receive a removable cover, shown in exploded apart relation.

FIG. 4 is a perspective view of the animal tracking unit 10 of FIG. 1. Here, the tracking unit 10 is ready to receive a removable cover 40, shown in exploded apart relation. The cover 40 is provided with an extending portion 42 that corresponds to the extending portion 22 of the stimulus unit 20, and which slides into the receiving portion 12 of the tracking unit 10 to form a dovetail connection in the same manner as that formed between the tracking unit 10 and the stimulus unit 20. The cover is also provided with through holes 44 through which the screws 30 may be screwed into the holes 14 of the tracking unit 10 to further secure the cover 40 to the tracking unit 10.

Figure 5A:
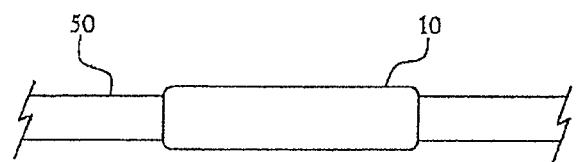
FIGS. 5A through 5C illustrate the docking of the stimulus unit to the tracking unit while fixed to an animal collar.
Figure 5B:
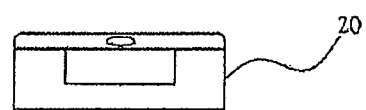
Figure 5C:
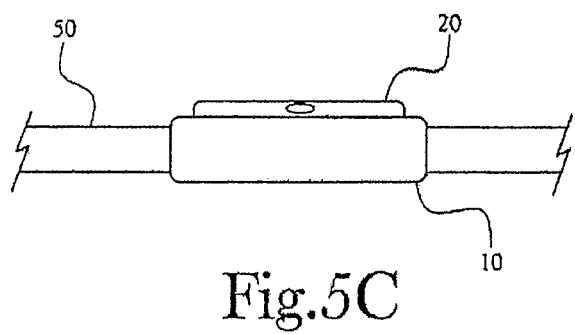

FIGS. 5A through 5C illustrate the docking of the stimulus unit 20 to the tracking unit 10 while fixed to an animal collar 50. These drawings are highly simplified in order to illustrate an "outside" view of the tracking unit 10 and stimulus unit 20 as provided to the animal encircling device (or collar or harness) 50 so as to be mounted on an animal. In FIG. 5A, the tracking unit 10 is fixed to the animal encircling device 50, an example of which may be a dog collar. The tracking unit 10 may be fixed to the dog collar 50 in any number of ways, and may be permanently or removably fixed to the dog collar 50.

FIG. 5B is a simple "outside" view of the stimulus unit 20, the "outside" orientation indicating the view from directly outside portions of the dog collar 50 adjacent to the tracking unit 10 in FIGS. 5A and 5C. In other words, the "outside" view is that of one looking at a dog wearing the dog collar 50.

FIG. 5C illustrates the stimulus unit 20 docked to the tracking unit 10.

Figure 6:
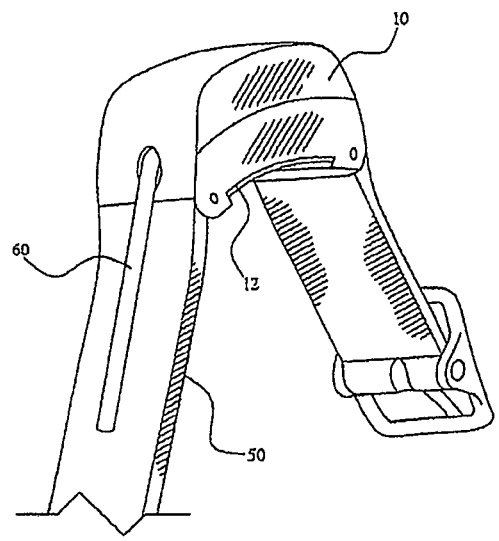
FIG. 6 is a perspective view of a portion of a modular dog tracking collar of the present invention, in one embodiment. The animal tracking unit is affixed to a dog collar, but without the stimulus unit.

FIG. 6 is a perspective view of a portion of a modular dog tracking collar 50 of the present invention, in one embodiment. The animal tracking unit 10 is affixed to a dog collar 50, but without the stimulus unit. As illustrated in FIG. 6, the receiving portion 12 of the tracking unit 10 is located on the inner side of the tracking unit 10, which is the side of the tracking unit 10 that is facing the animal, e.g., the dog. The tracking unit 10 is able to track the dog and communicate with the control device regardless of whether the stimulus unit 20 is docked with the tracking unit 10.

FIG. 6 also illustrates an antenna 60 provided to the tracking unit 10, which has been omitted from various other illustrated embodiments for the sake of clarity. As previously described, the tracking unit may be provided with more than one antenna.

Figure 7:
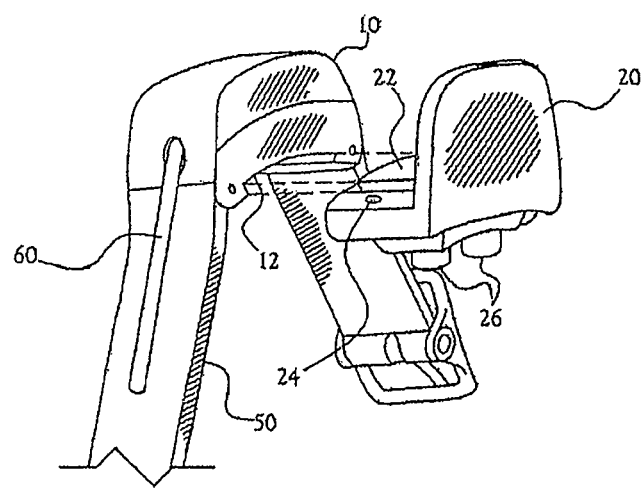
FIG. 7 is a perspective view of the modular dog collar of FIG. 6. Here, the stimulus unit is shown in exploded-apart relation to the animal tracking unit.

FIG. 7 is a perspective view of the modular dog collar 50 of FIG. 6. Here, the stimulus unit 20 is shown in exploded-apart relation to the animal tracking unit 10. As illustrated in FIG. 7, the extending portion 22 of the stimulus unit 20 slides into the receiving portion 12 of the tracking unit 10 to dock the units in a dovetail connection. Once docked, the protrusions 26 extend away from the tracking unit 10 and stimulus unit 20 toward the dog wearing the dog collar 50.

Figure 8:
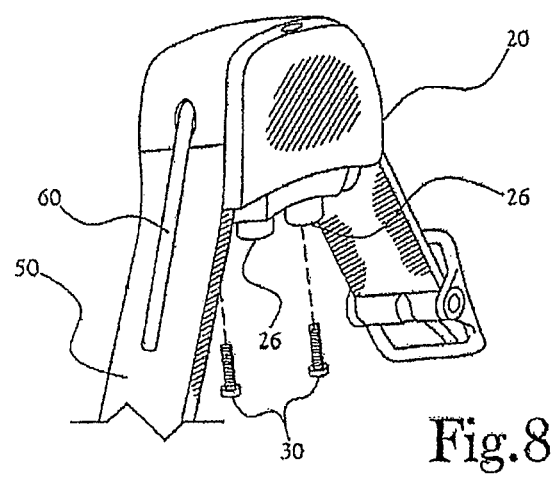
FIG. 8 is a perspective view of the modular dog collar of FIG. 7. Here, the stimulus unit has been docked with the animal tracking unit, forming an integral modular dog collar.

FIG. 8 is a perspective view of the modular dog collar 50 of FIG. 7. Here, the stimulus unit 10 has been docked with the animal tracking unit 20, forming an integral modular dog collar. As illustrated in FIG. 8, the screws 30 pass through the through holes 24 of the stimulus unit 20 to screw into the holes 14 of the tracking unit 10. While the screws 30 further secure the docking of the stimulus unit 20 to the tracking unit 10, it is understood that such further securing and adhesion members are not required under other various embodiments.

Figure 9:
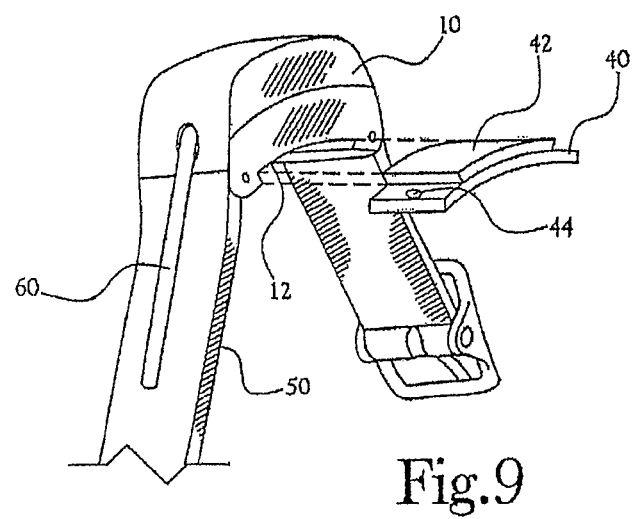
FIG. 9 is another perspective view of the modular dog collar of FIG. 6. Here, a removable cover is shown in exploded-apart relation to the animal tracking unit.

FIG. 9 is another perspective view of the modular dog collar 50 of FIG. 6. Here, a removable cover 40 is shown in exploded-apart relation to the animal tracking unit. As illustrated in FIG. 9, the extending portion 42 of the cover 40 slides into the receiving portion 12 of the tracking unit 10 to couple the cover to the tracking unit 10 in a dovetail connection. The use of the cover 40, in the absence of the stimulus unit 20, provides a smooth contact surface to increase the comfort of the dog wearing the dog collar 50.

Figure 10:
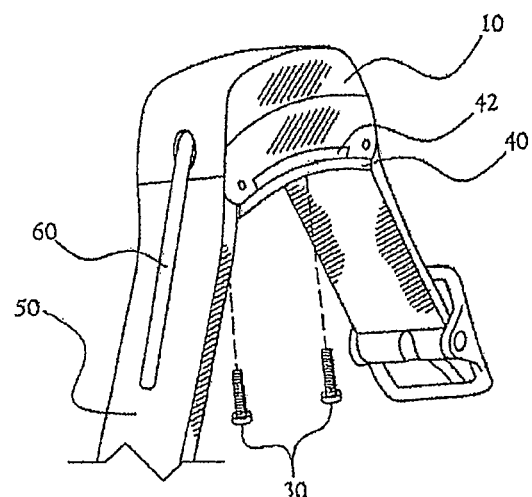
FIG. 10 is a perspective view of the modular dog collar of FIG. 9. Here, the removable cover has been docked with the animal tracking unit.

FIG. 10 is a perspective view of the modular dog collar 50 of FIG. 9. Here, the removable cover has been docked with the animal tracking unit 10. As illustrated in FIG. 10, the screws 30 pass through the through holes 44 of the cover 40 to screw into the holes 14 of the tracking unit 10. While the screws 30 further secure the cover 40 to the tracking unit 10, it is understood that such further securing and adhesion members are not required under other various embodiments.

Figure 11:
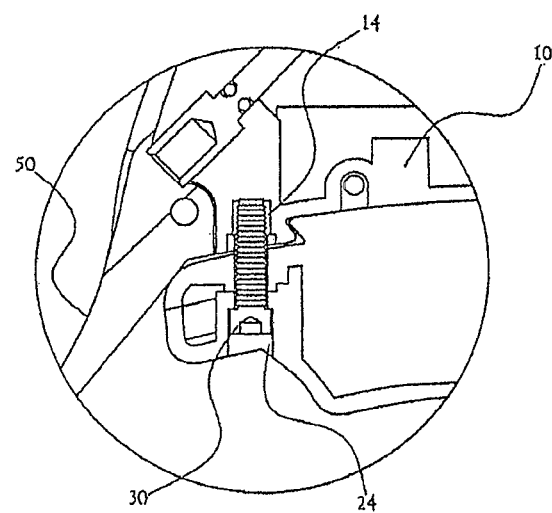
FIG. 11 is an enlarged partial cross-section of the docked tracking unit and stimulus unit. A screw is shown securing the two docked components together.

FIG. 11 is an enlarged partial cross-section of the docked tracking unit 10 and stimulus unit 20. A screw 30 is shown securing the two docked components together. As illustrated in FIG. 11, the screw 30 is extends through the through hole 24 of the stimulus unit 20 to screw into the hole 14 of the tracking unit 10, further securing the docking of the stimulus unit 20 and the tracking unit 10. While the screws 30 further secure the docking of the stimulus unit 20 to the tracking unit 10, it is understood that such further securing and adhesion members are not required under various other embodiments.

Figure 12:
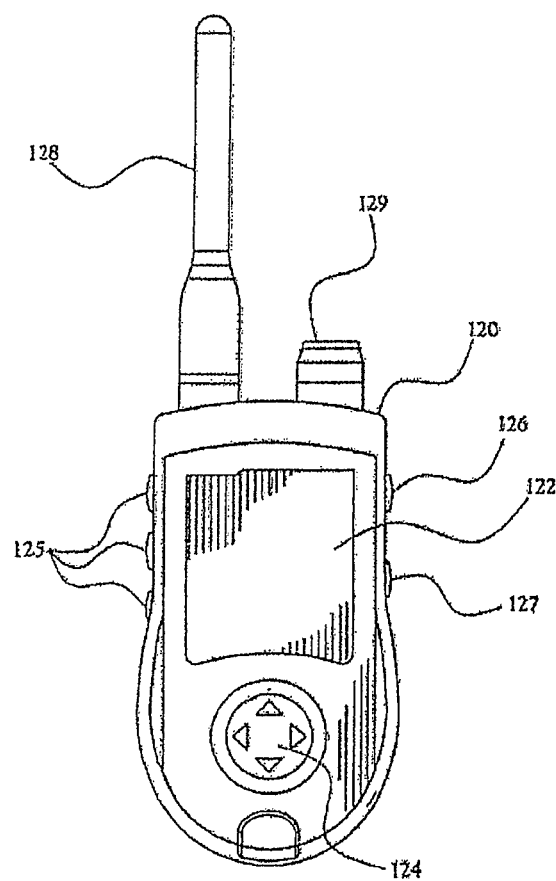
FIG. 12 is a plan view of a control device used to control the tracking unit and the stimulus unit of FIG. 8, in one embodiment.

FIG. 12 is a view of a control device 120 used to control the tracking unit and the stimulus unit of FIG. 8, in one embodiment. As illustrated in FIG. 12, this example control device 120 is a remote handheld control device. The control device 120 is provided with a display 122 to display a graphical user interface (GUI), a direction button 124 to interface with the GUI, a plurality of stimulus buttons 125, a back button 126, a tracking/training toggle button 127, a GNSS antenna 129, and a control device antenna 128.

The control device 120 determines a user's location from a built-in GPS antenna 129. The built-in GPS antenna receives location updates from a GPS antenna provided to the tracking unit 10 to track the location of the animal equipped with the tracking and control apparatus. The GPS antenna provided to the tracking unit 10 may be mounted on the dog collar 50. The display 122 may display the user's location, the location of one or more animals provided with the animal tracking and control apparatus relative to the user or to a predetermined area, a list of options for stimulating the respective animals, levels of stimulation, and so on. The stimulus buttons 125 may be used to send a signal to activate the stimulus unit 20 to deliver a stimulus to the animal. As previously described, the level of the stimulus is adjustable through the control device 120.

The control device 120 under an embodiment may communicate with the tracking unit 10 and the stimulus unit 20 on separate channels in order to minimize interference between the respective signals.

FIGS. 13 through 16 illustrate various displays and graphical heading indicators, which may be shown on the control device 120 of FIG. 12 using display 122 according to various examples. Referring to FIGS. 13 through 16, the example display screens 122 provided by the control device 120 include tracking information for three different dogs, as generally represented by the display icons corresponding to the current direction and location of the animal and/or past locations and directions of the animal. In the example embodiments, the animals being tracked are referred to in some of the figures as Ripley, Talon, and Lulu, respectively. Note that the present general inventive concept is not limited to any particular number of tracked animals. Moreover, although the example embodiments of FIGS. 13 through 16 illustrate various different dogs being tracked, the present general inventive concept is not limited to any particular number or type of animal.

Figure 13:
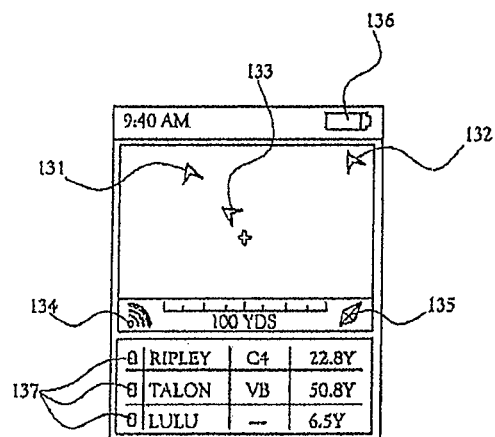
FIG. 13 illustrates a display screen generated by the control device of FIG. 12, in one example.

FIG. 13 illustrates a display screen 122 generated by the control device 120 of FIG. 12, in one example. In FIG. 13, the three different direction indicator arrows 131, 132, 133 correspond to the current location and direction, or heading, of the respective animals relative to the user's position. The cross-hair in the middle of the screen can be used to represent the current location of the user, although the present general inventive concept is not limited to any particular type of graphical indicators, or icons, to represent the animal and user. For example, the graphical representations of the animals could take the form of an animal-shaped icon. In various example embodiments, the head of the animal could be used to indicate the current direction of the animal, and the body of the animal could be used to indicate the current location of the animal based on the current scale of the display screen. The icons can indicate whether the dog is running, on point, treed, stationary, barking, and the like, and the movement of the user.

Although the user's location is represented in the illustrated embodiments as a cross-hair, it is possible to display the location and heading of the user using any number of icons, such as a human figure, arrow, circle, or other icon. The orientation of the direction arrow (e.g., up, down, left right, etc.) can represent the current heading or direction of the animal and user relative to one another, and the icons can be color coded so the user knows which icon corresponds to each dog by the color of the icon matching the color of the text.

The display 122 can include an incremented scale to provide a visual representation of the actual distance between the user and the respective animals, and can display the actual calculated distances from the user for each animal. The user has the option to keep the scale at a fixed distance (e.g., 100 yards), or the user can select Auto where the scale will automatically adjust in real time once the animal goes outside the scale. The unit can periodically check to see if any of the animals are outside the scale and can zoom to a level where all the animals are visible on the screen. If the animal is lost or off-screen, a graphical indicator, such as an outline of the icon or a blinking icon representing the animal can be provided to the user, or a separate tab can be provided showing the animal's location in relation to the scaled display.

In FIG. 13, Ripley is represented as 131; Talon as 132; and Lulu as 133. Ripley 131 is shown located 22.8 yards from the user and provided with continuous stimulation C4 according to one of the stimulus buttons 125; Talon 132 is shown located 50.8 yards from the user and provided with vibration stimulation VB according to one of the stimulus buttons 125; and Lulu 133 is shown located 6.5 yards from the user with no stimulation provided. The stimulation buttons 125 of the control device 120 can be selectively assigned to each dog, respectively, and used to provide the corresponding stimulus as desired by the user.

The display can include a GPS fix indicator 134, compass indicator 135, and battery indicator 136. The display can also include separate battery level indicators 137 corresponding to the battery level of the individual GPS units, respectively. In various example embodiments, the GPS fix indicator 134 can indicate whether the control device 120 has achieved a 'fix' on the animals as determined by a GPS engine. The compass indicator 135 can indicate the current orientation of the control device 120 as determined by the compass unit.

Figure 14:
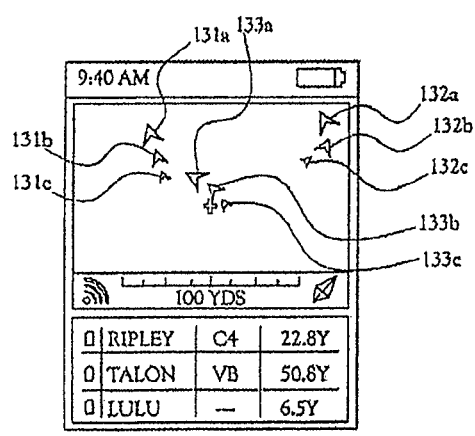
FIG. 14 illustrates another display screen generated by the control device of FIG. 12, in one example.

FIG. 14 illustrates another display screen 122 generated by the control device of FIG. 12, in one example. In FIG. 14, similar to FIG. 13, the three large direction indicator arrows 131a, 132a, 133a correspond to the current location and direction of the animals relative to the user's position. However, FIG. 14 includes a plurality of additional and smaller indicator arrows 131a, 131b, 131c; 132a, 132b, 132c; 133a, 133b, 133c, corresponding to a plurality of historical data points relative to each animal's movement. These additional data points are represented in the form of smaller (i.e., subdued) arrows, although any other shape, number, and/or size of icons could be used.

In FIG. 14, the smaller historical data points can be displayed in an incrementally subdued fashion such that the oldest data point is displayed in a lighter or fainter strength, whereas the most current data point is displayed in full strength, to provide a visual representation of the historical trail of the animal. Thus, the movement and data points transmitted by the first device can be received and displayed by the second device to provide a historical mapping as well as current location and direction information of the animal's movement relative to the user.

Figure 15:
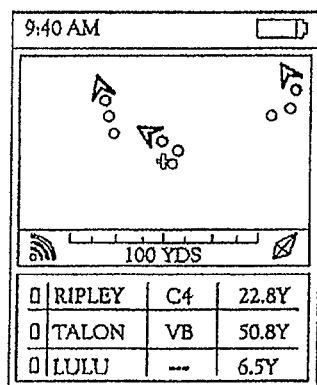
FIG. 15 illustrates another display screen generated by the control device of FIG. 12, in one example.

FIG. 15 illustrates another display screen 122 generated by the control device 120 of FIG. 12, in one example. In FIG. 15, similar to FIGS. 13 and 14, the three large direction indicator arrows correspond to the current location and direction of the animals relative to the user's position. However, FIG. 15 includes a plurality of circles 131d, 132d, 133d corresponding to historical data points relative to the animal's movement. Although these additional data points are represented in the form of circles, any other shape, size, and number of icons could be used. The smaller circles representing historical data points can be displayed in an incrementally subdued fashion such that the oldest data point is displayed in a lighter or fainter strength, whereas the most current data point is displayed in full strength, to provide a visual representation of the historical trail of the animal. Thus, similar to the example embodiment of FIG. 14, the movement and data points transmitted by the first device (or tracking unit 10) can be received and displayed by the second device (or control device 120) to provide a historical mapping as well as current location and direction information of the animal's movement relative to the user.

Figure 16:
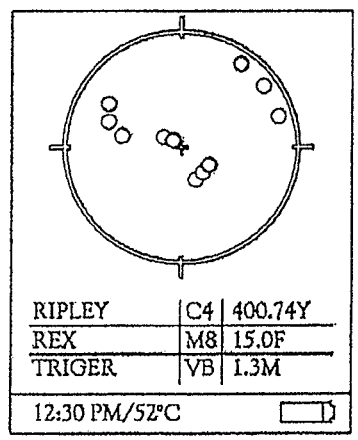
FIG. 16 illustrates another display screen generated by the control device of FIG. 12, in one example.

FIG. 16 illustrates another display screen generated by the control device 120 of FIG. 12, in one example. FIG. 16 includes a plurality of circles 131e, 132e, 133e corresponding to historical data points relative to the animal's movement, but does not include the three large indicator arrows. These historical data points are represented in the form of circles, although any other shape, size, and number could be used. In FIG. 16, similar to FIG. 15, the smaller circles representing historical data points can be displayed in an incrementally subdued fashion such that the oldest data point is displayed in a lighter or fainter strength, whereas the most current data point is displayed in full strength, to provide a visual representation of the historical trail of the animal. Thus, the movement and data points transmitted by the first device (or tracking unit 10) can be received and displayed by the second device (or control device 120) to provide a historical mapping of the animal's movement relative to the user, with the most recent circle also providing the current location of the first device.

In the example embodiments, the change of position between the most recent data point and the prior data point can be used to provide a directional vector, or indicator, indicating the dog's recent movement. This vector information can be used to graphically display the dog's current heading in relation to the user. In the example embodiments, the dog's current heading can be indicated by an arrow while the historical location data points are displayed as dots or circles, although it is possible that any other shape or number of data points could be used without departing from the broader scope and teachings of the present general inventive concept.

The user can select to display a complete history of the paths taken by the respective animals, a partial history, or no history at all. The historical paths can take the form of a series of icons, historical data points, or a continuous path line or bread-crumb trail to show the path of the animal over time. For example, if the screen becomes cluttered with numerous paths, the user can selectively choose the length of paths shown, or no paths shown. The handheld control device can be programmed to automatically refresh the display screen at predetermined intervals or lengths of trails to maintain a fresh looking display.

Figure 17:
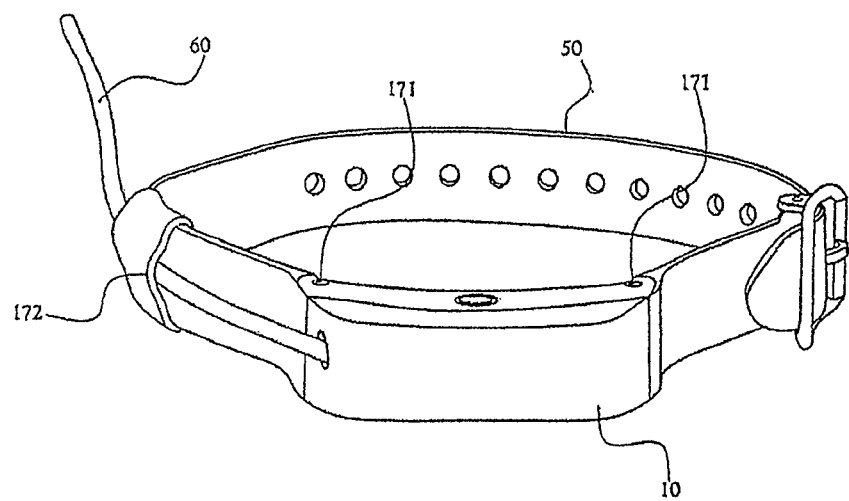
FIG. 17 is a perspective view of a modular dog tracking collar of the present invention, in one embodiment. The collar includes an animal tracking unit and docked stimulus unit.

FIG. 17 is a perspective view of a modular dog tracking collar under an embodiment. The collar includes an animal tracking unit 10 and docked stimulus unit 20. FIG. 17 is intended to be a more complete showing of the modular dog collar of FIG. 6. In FIG. 17, the dog collar 50 is affixed to the tracking unit 10 with screws 171. The animal encircling device 50 may be provided with a loop 172 to secure a positioning of the antenna 60.

Figure 18:
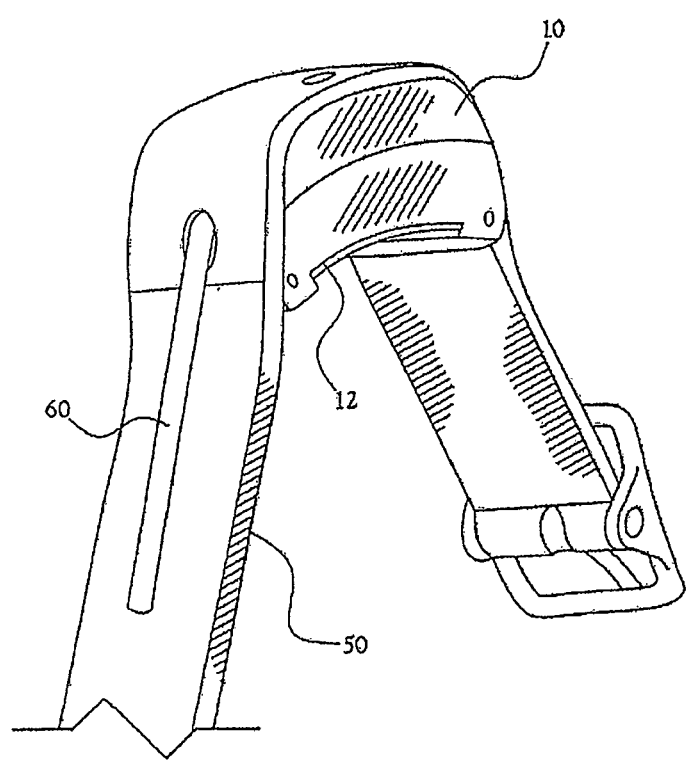
FIG. 18 is a perspective view of the animal tracking unit and docked stimulus unit from FIG. 17.

FIG. 18 illustrates a view of the tracking unit 10 fixed to the dog collar 50 according to another embodiment of the present general inventive concept. FIG. 18 is similar to FIG. 6 except that dog collar 50 wraps over the tracking unit 10 on a surface facing away from the dog, rather than being fixed to ends of the tracking unit 50 with screws 171 as in FIG. 17. As previously described, any number of collars and methods of fixing the collars to the tracking unit 10 may be used.

Under an alternative embodiment to the animal tracking and control system described above, the stimulation unit may be a slave device to the tracking unit. The alternative embodiment comprises a stimulation unit/module (hereinafter referred to as a modular E-collar unit or stimulus unit) which mates with a stand-alone tracking unit/module (hereinafter referred to as a stand-alone GPS tracking unit or tracking unit) to form an integrated GPS tracking/E-collar system. As the principle difference from the tracking/control systems described above, the E-collar unit is entirely a slave device and has no smart circuitry, no independent power supply and no antenna. Accordingly, the modular E-collar unit is dependent upon the GPS tracking unit for its power supply, for its general operation and for communication to and from a remote hand held control device. The integrated system is further described below with reference to FIGS. 19-36.

Figure 19:
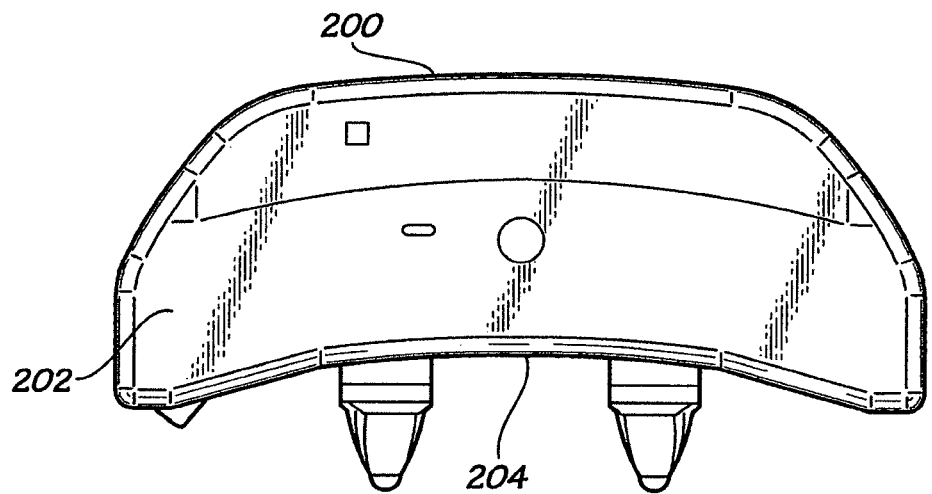
FIG. 19 is a front view of an integrated GPS tracking/E-collar system, under an embodiment.

FIG. 19 is a front view of the integrated GPS tracking/ E-collar system 200. The system 200 features the GPS tracking unit 202 coupled with the E-collar unit 204.

Figure 20:
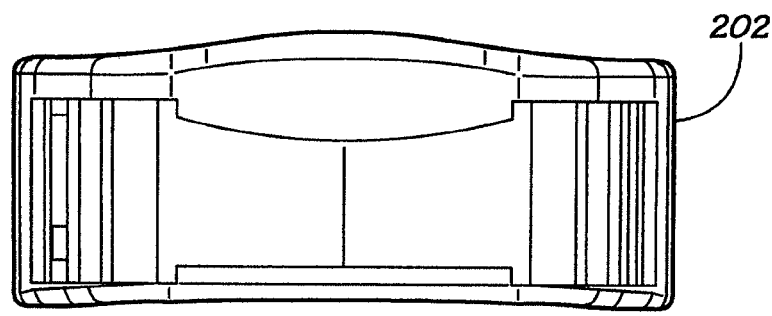
FIG. 20 is a top down view of an integrated GPS tracking/E-collar system, under an embodiment.

FIG. 20 is a top down view of the integrated GPS tracking/E-collar system 200.

Figure 21:
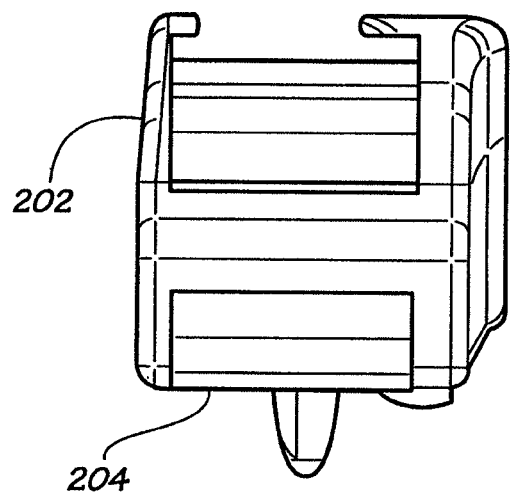
FIG. 21 is a side view of an integrated GPS tracking/E-collar system, under an embodiment.

FIG. 21 is a side view of the integrated GPS tracking/E-collar system 200 comprising the GPS tracking unit 202 coupled with the E-collar unit 204.

Figure 22:
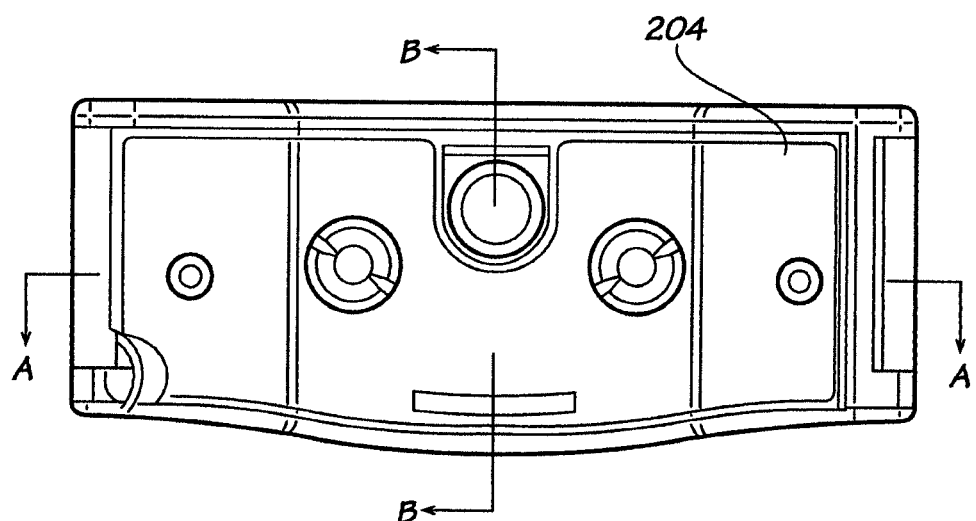
FIG. 22 is a bottom view of the integrated GPS tracking/E-collar system, under an embodiment.

FIG. 22 is a bottom view of the integrated GPS tracking/ E-collar system 200. The bottom view as seen in FIG. 22 comprises a bottom view of a modular E-collar unit 204 secured to the GPS tracking unit.

Figure 23A:
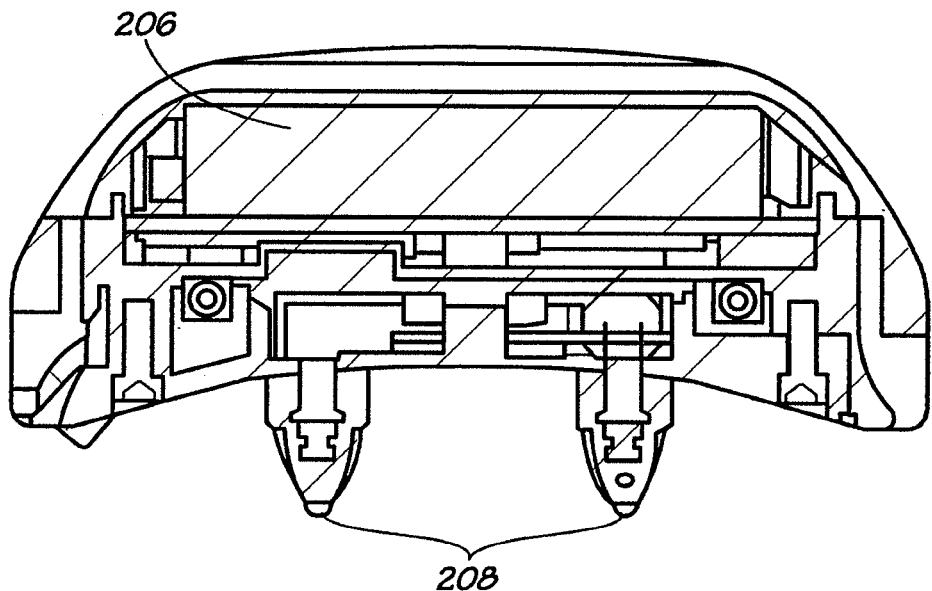
FIGS. 23A and 23B are cross-sectional views of the integrated GPS tracking/E-collar system, under an embodiment.
Figure 23B:
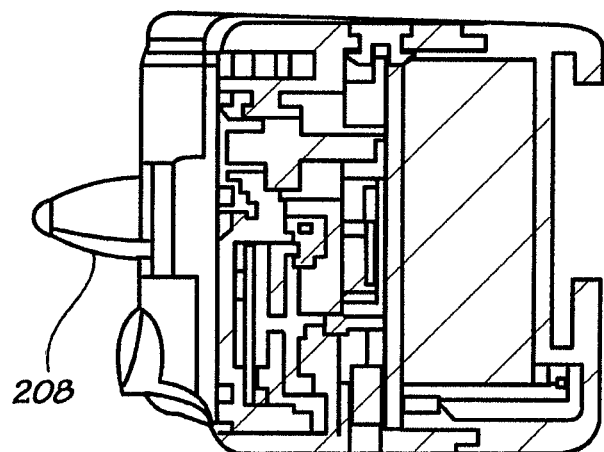

FIGS. 23A and 23B are cross-sectional views of the integrated GPS tracking/E-collar system 200. FIG. 23A is taken across Line A-A of FIG. 22, while FIG. 23B is taken across Line B-B of FIG. 22. FIG. 23A shows the power supply 206 of the GPS tracking unit 202. The power supply may include a lithium ion polymer battery. Both FIGS. 23A and 23B show the stimulus probes 208 extending from the E-collar unit. Under an embodiment, the GPS tracking unit 202 receives command signals from a remote handheld control unit or transceiver. In response to such signals, the GPS tracking unit may communicate with the E-collar unit through the signal contacts (FIG. 24, 216) to initiate application of a stimulus to the animal through stimulus probes 208.

As already noted above, the E-collar unit 204 preferably does not have its own firmware or microcontroller or other "smart circuitry." Further, the E-collar unit 204 preferably does not have its own battery or other power supply. Still further, the E-collar unit 204 preferably does not have its own antenna. Instead, the E-collar unit 204 operates essentially as a slave system dependent on the GPS tracking unit 202 for operation and communication back to the hand held device. Note that such handheld device is not shown in FIGS. 19-33 but is analogous to the handheld device 120 described in FIG. 12 above.

Figure 24:
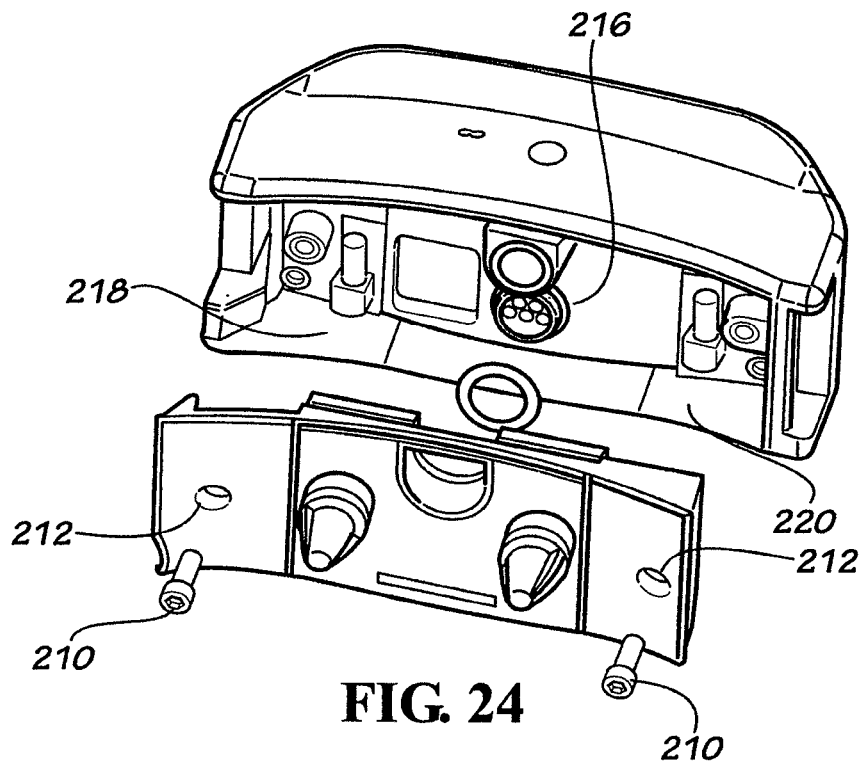
FIG. 24 shows an exploded view of the integrated GPS tracking/E-collar system, under an embodiment.

FIGS. 19-23 show the E-collar unit 204 secured to the GPS tracking unit 202. FIG. 24 shows an exploded view of the integrated GPS tracking/E-collar system. FIG. 24 displays the fasteners 210 which pass through holes 212 in the E-collar unit 204 to secure the E-collar unit 204 to the GPS tracking unit 202. Using the fasteners 210, the modular E-collar unit 204 may under an embodiment be easily secured to or removed from the GPS tracking unit 202.

FIG. 24 also shows the signal contacts 216 of the GPS tracking unit 202. When the E-collar unit 204 is secured to the GPS tracking unit 202, the tracking side signal connections 216 couple with the E-collar (i.e. stimulus unit) signal connections (not shown) and are surrounded by a water tight seal system which provides a hermetically sealed communication pathway between the E-collar unit and the GPS tracking unit. The signal contacts may be electrical but embodiments are not so limited. The contacts may comprise pogo pin or metal spring connections. As another example, the contacts may comprise an optical coupling.

Once the E-collar unit is fastened to the GPS tracking unit, a microcontroller of the GPS tracking unit 202 automatically detects that the E-collar stimulus unit 204 has been installed and begins to communicate with the unit 204 based on instructions received from a hand held control device. A microcontroller (further disclosed in FIG. 30 below) housed in the tracking unit features a detection pin coupled to the signal contacts of the GPS tracking unit 202 which detects the presence of a connected E-collar unit 204 thereby initiating communication. Due to the fact that the modular E-collar is a slave device, the GPS unit 202 provides identical tracking functionality without the E-collar. When the microcontroller of the GPS tracking unit fails to detect the presence of a communication coupling with signal contacts of the E-collar unit, the GPS tracking unit simply operates as a stand-alone unit without the stimulus functionality otherwise provided by the E-collar unit. The easy removal of E-collar stimulus unit recommends the unit for use in dog competitions in which competing dogs are not allowed to wear any form of stimulus device during competition performances. When the E-collar unit is disengaged from the GPS tracking unit, a user of the integrated system may replace the active unit with a dummy (or rather inactive) E-collar unit.

Note that the stimulus applied by the E-collar stimulus unit may be electrical but embodiments are not so limited. Under alternative embodiments, the applied stimulus may be noise, tone or vibration. Further, when the E-collar unit is disengaged from the GPS tracking unit, the tracking unit may not apply any stimulus to an animal.

FIG. 24 also displays a GPS co-axial cable connector 218 and a radio co-axial cable connector 220 which respectively couple with a GPS antenna and a radio antenna. The GPS antenna and a radio antenna are shown below in FIGS. 26-28.

Figure 25:
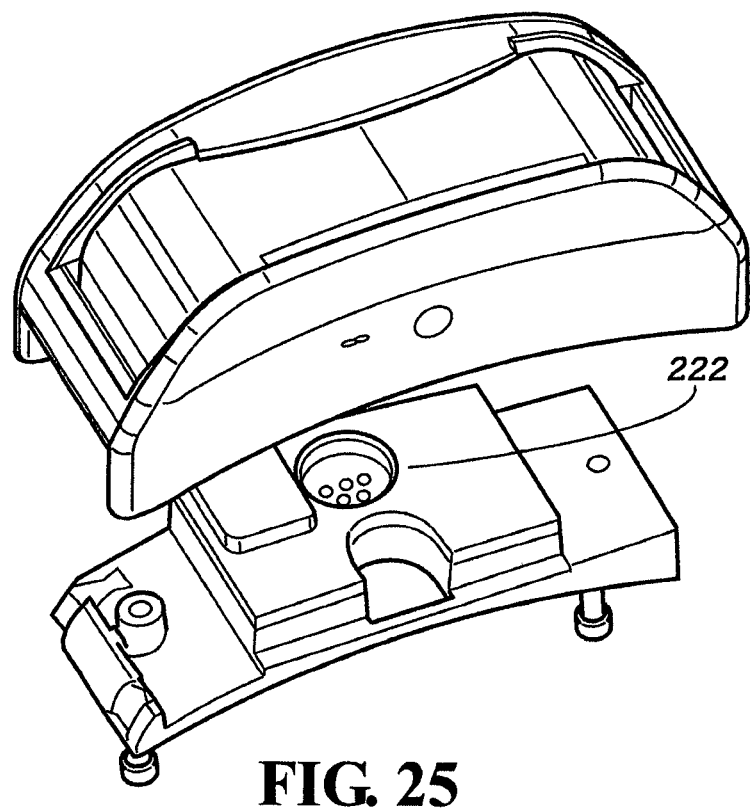
FIG. 25 provides another exploded view of the integrated GPS tracking/E-collar system, under an embodiment.

FIG. 25 provides another exploded view of the integrated GPS tracking/E-collar system. The E-collar signal contacts 222 are seen on the E-collar unit.

FIG. 26 is a side view of the integrated GPS tracking/E-collar system. The GPS unit co-axial cable connector 218 is coupled to the GPS antenna 226 using a GPS co-axial cable 224. The E-collar unit radio co-axial cable connector 220 is coupled to the radio antenna 228.

FIG. 27 is a top view of the integrated GPS tracking/E-collar system from FIG. 26.

FIG. 28 is a front view of the integrated GPS tracking/E-collar system from FIG. 26.

Figure 29:
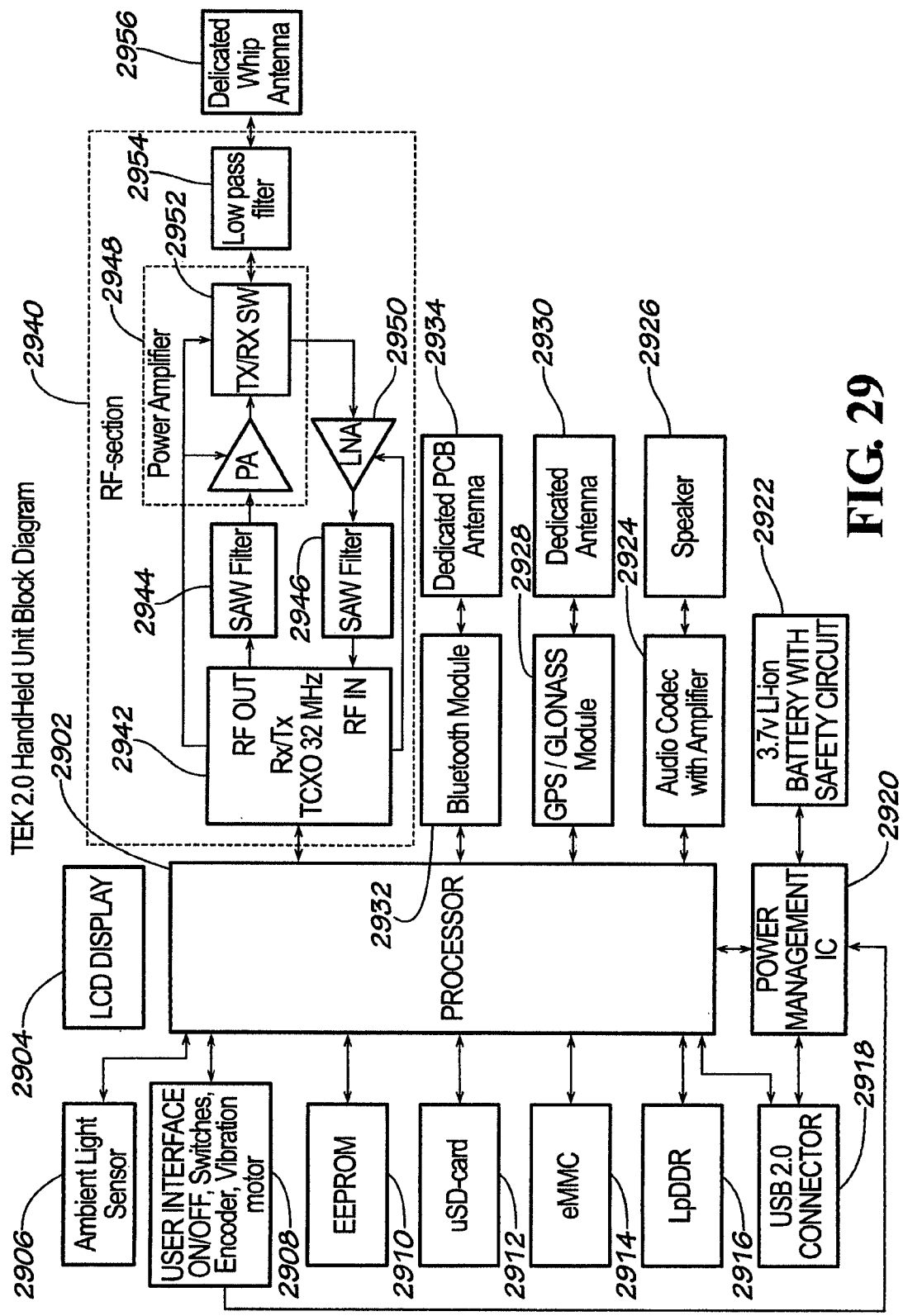
FIG. 29 is a unit block diagram describing circuitry of a handheld control device, under an embodiment.

As indicated above, the GPS tracking unit communicates with a handheld control device. The handheld control device comprises under one embodiment a TEK 2.0 handheld unit. FIG. 29 comprises a unit block diagram representing circuitry of a handheld control device. The circuitry includes a processor 2902. The processor is coupled to an LCD display 2904 which presents data and graphics to a user. The processor is also coupled to an ambient light sensor 2906. Under one embodiment, the sensor measures ambient light levels of the device's environment. The processor may adjust the LCD display back light brightness based on measured ambient light levels. The processor 2902 may adjust LCD display back light brightness using a power management-integrated circuit 2920.

The processor 2902 is coupled to memory modules 2910-2916. The memory modules include EEPROM (Electronically Erasable Read-Only Memory) 2910. EEPROM comprises a type of non-volatile memory used in computers and other electronic devices to store small amounts of data that must be saved when power is removed, e.g., calibration tables or device configuration. Under one embodiment, EEPROM 2910 stores settings and calibration data for the handheld control device. The memory modules also include LPDDR1 2916 which comprises low power double data rate synchronous DRAM (Dynamic Random Access Memory). LPDDR1 2916 provides the processor 2902 a 200 MHz bus for RAM memory usage. The memory module also includes an eMMC component 2914. Under one embodiment eMMC architecture provides MultiMediaCard flash memory for use in circuit boards as an embedded non-volatile memory system. The eMMC component 2914 provides memory for the device's operating system, maps and applications under one embodiment. The memory modules also include uSD card component 2912. Under one embodiment, a uSD card is removably coupled to a uSD card reader. This uSD card may store special maps and files of a user.

The processor 2902 is also coupled to a user interface 2908. The interface 2908 includes an On/Off button, switches, a rotary encoder and vibration motor. Under one embodiment, a user manipulates the rotary encoder to move one or more cursors among interface menu items. Under one embodiment, a user implements switches to make selections and settings for general operation of the device. Under one embodiment, a user manipulates buttons located on a side of the device to send stimulation commands to the GPS tracking unit for communication to the stimulus unit (E-collar unit 204). The user interface also includes a vibration module to provide alarms and warnings to the user.

The processor 2902 is also coupled to a GPS/GLONASS Module 2928. The GPS/GLONASS module comprises a parallel GPS/GNSS receiver with 99 channels for searching satellite transmissions and 33 channels for tracking the GPS tracking unit. The GPS/GLONASS module is coupled to a dedicated antenna 2930.

The processor 2902 is coupled to a Power Management Integrated Circuit (PMIC) 2920. Under an embodiment, power management integrated circuits (power management ICs or PMICs) are integrated circuits for managing power requirements of a host circuit/system. The PMIC 2920 may include an integrated linear recharger for the Lithium-ion battery 2922 coupled to the PMIC. Further, the PMIC regulates all used voltages for the processor and accessories. The Lithium-ion battery includes an integrated safety circuit and a Negative Temperature Coefficient (NTC) resistor.

The processor 2902 is also coupled to an Audio Codec module 2924. An audio codec is a device or computer program capable of coding or decoding a digital stream of audio. In software, an audio codec is a computer program implementing an algorithm that compresses and decompresses digital audio data according to a given audio file format or streaming media audio format. Under an embodiment, the audio codec 2924 generates sounds and processes MP3 files. The audio codec 2924 includes an integrated 1-Watt speaker amplifier.

The processor is coupled to a Bluetooth module 2932. Bluetooth is a wireless technology for exchanging data over short distances. The Bluetooth module includes integrated stack software and comprises class 1 and class 2 configurations.

The processor is coupled to a USB 2.0 connector 2918 for recharging the battery. The USB 2.0 connector also provides an interface to external devices.

The processor is coupled to an RF module 2940 The RF Module includes a TCXO 32 MHz transceiver. The transceiver integrated circuit (IC) works from an 866 to a 915 MHz band. The transceiver implements Gaussian frequency shift keying modulation. The transceiver module transmits data at a rate of 3000 bit/s. The transceiver module provides 25 kHz channel separation.

The transceiver IC 2942 is coupled to Surface Acoustic Wave (SAW) 2944, 2946 filters which filter incoming and outgoing transmissions. The SAW filters reduce spurious emissions and provide out-of-band interference rejection under one embodiment. SAW filters may be dedicated for each frequency band. A power amplifier 2948 amplifies RF signals from 10-20 MW to 0.5 W or 1 W. A Tx/Rx RF switch 2952 is integrated into the power amplifier under an embodiment. The power amplifier 2948 is coupled to a low pass filter 2954 which reduces spurious emissions of the power amplifier. The Tx/Rx switch is coupled to a low noise amplifier 2950 which amplifies received signals via the whip antenna 2956 from the GPS tracking unit.

The processor 2902 of the handheld device performs one or more of the following functions:

produces terrain map calculations, rotations and visualizes maps via LCD display, under an embodiment;

processes user interface via rotary encoder and switches, under an embodiment;

receives, evaluates, measures handheld device's navigation coordinates and speed via GPS/GLONASS module, under an embodiment;

receives GPS-collar location messages via RF-receiver and visualizes objects to the LCD display, under an embodiment;

transmits stimulation commands to the GPS tracking unit via RF-transmitter, under an embodiment;

transmits handheld device's geological location to other handheld units in same group via RF-transmitter, under an embodiment;

provides power management control via power management IC, under an embodiment;

provides battery recharge control via power management IC, under an embodiment;

provides two way communication via Bluetooth module, under an embodiment;

provides two way communication via USB 2.0, under an embodiment;

generates audio signals and sounds via audio codec IC, under an embodiment;

measures ambient light level for adjusting the LCD display back light level, under an embodiment;

saves/reads data from the memory modules, under an embodiment; and saves/reads user settings to/from the memory modules 2910-2916, under an embodiment.

Figure 30:
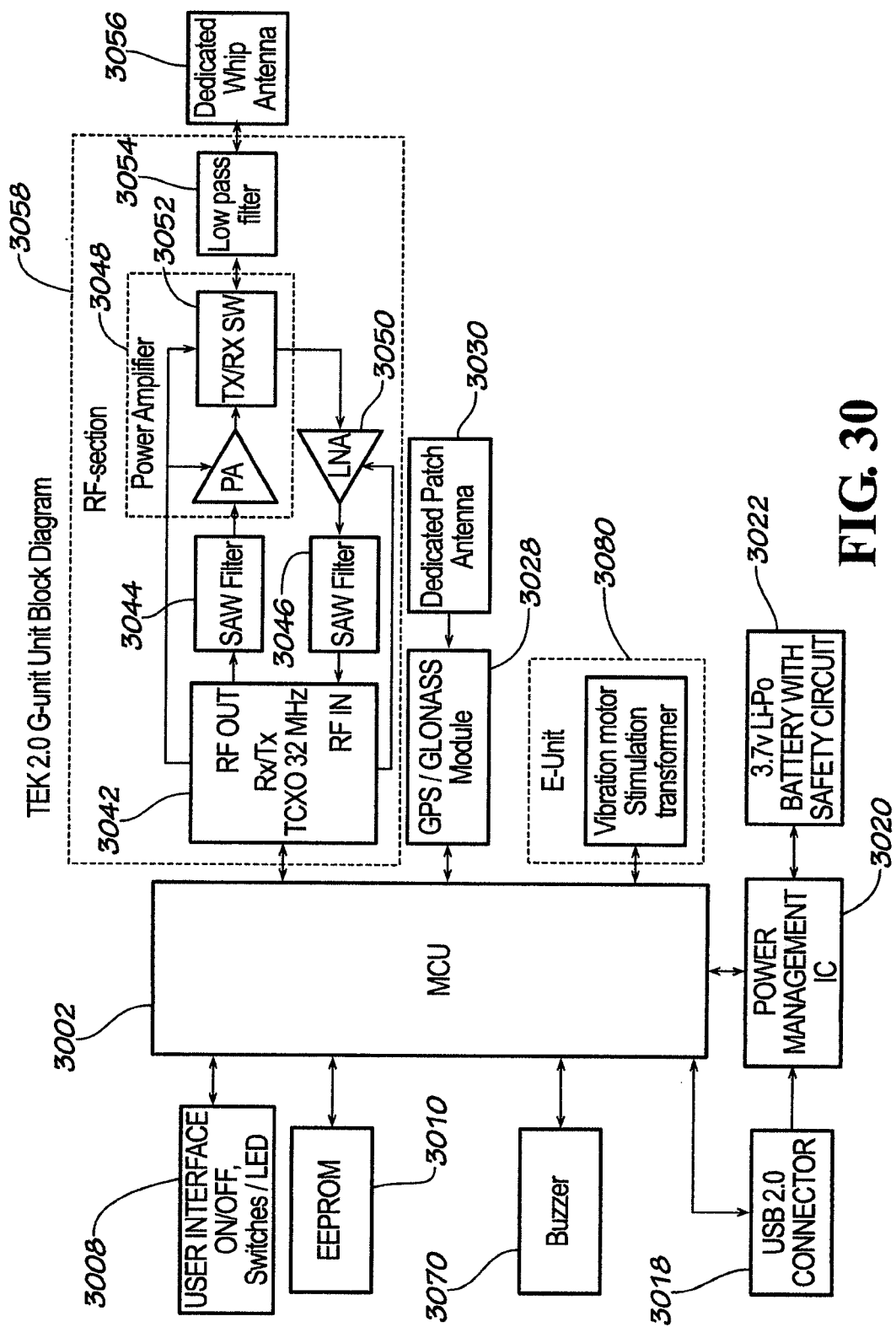
FIG. 30 is a unit block diagram describing circuitry of a tracking unit, under an embodiment.

As indicated above, the handheld control device wirelessly communicates with the GPS tracking unit (and E-collar unit through the GPS tracking unit). FIG. 30 shows a block diagram describing circuitry of the GPS tracking unit under an embodiment.

As seen in FIG. 30, the tracking unit includes a Micro Controlling Unit (MCU) 3002. The MCU 3002 is coupled to a user interface 3008. The interface 3008 includes an On/Off button for turning the device on and off. Under one embodiment, an LED light indicates On/Off status of the tracking unit.

The MCU 3002 is coupled to an EEPROM (Electronically Erasable Read-Only Memory) memory module 3010. EEPROM comprises a type of non-volatile memory used in computers and other electronic devices to store small amounts of data that must be saved when power is removed, e.g., calibration tables or device configuration. Under one embodiment, the EEPROM module 3010 stores settings and calibration data for the tracking unit.

The MCU 3002 is also coupled to a Power Management Integrated Circuit (PMIC) 3020. Under an embodiment, the PMIC 3020 may include an integrated linear recharger for the 3.7V Lithium ion battery 3022 coupled to the PMIC. The Lithium ion battery includes a safety circuit and Negative Temperature Coefficient (NTC) resistor.

The MCU 3002 is also coupled to a buzzer component 3070. The buzzer component 3070 generates sounds by using a driver circuit.

The MCU 3002 is coupled to an RF module 3058 which includes components 3042-3056. The RF module components are under one embodiment the same as (and function in a manner analogous to) the components of RF module 2940 shown in FIG. 29.

The MCU 3002 is coupled to the E-collar unit 3080. The E-collar unit applies harmless electric stimulation to the dog when commands arrive via RF receiver circuitry of the tracking unit and are subsequently communicated to E-collar unit. The E-collar unit applies harmless vibration to the dog when commands arrive via RF receiver circuitry of the tracking unit and are subsequently communicated to E-collar unit.

The MCU 3002 performs one or more of the following functions:

measures tracking unit's navigation coordinates and speed via GPS/GLONASS module, under an embodiment;

receives stimulation commands from the handheld device via RF-transmitter, under an embodiment;

transmits tracking unit's own geological location to the hand held devices/units in same group via RF-transmitter, under an embodiment;

implements battery recharge control via power management IC, under an embodiment;

provides two way communication with external devices via USB 2.0, under an embodiment;

generates audio signals and sounds via buzzer, under an embodiment; and saves/reads data from the memory 3010, under an embodiment.

Under an embodiment, the transceiver of the tracking unit's RF module transmits signals including positioning date to the remote handheld control device at defined intervals ranging from 2.5 seconds to 2 minutes; otherwise the transceiver listens for command signals transmitted by the remote device. A command signal may comprise an instruction to apply stimulus to an animal wearing the integrated GPS tracking/E-collar system.

The tracking unit may also include a 3D accelerometer and magnetometer component that functions to identify and report a stance or posture of an animal wearing the integrated system. For example, a dog on point assumes a different posture than a dog treeing an animal. The 3D accelerometer and magnetometer detect the posture and report the activity to the remote handheld control unit.

The tracking unit may also include a bark detection circuitry. The bark detection circuitry detects and reports barks per minute to a remote handheld controller. The bark per minute metric may be unique to certain animal behaviors. For example, the bark per minute is different for a dog that is tracking versus baying an animal. The microcontroller reports the bark per minute metric to the remote handheld transceiver. Accordingly, a user of the integrated GPS tracking/E-collar unit system may use the bark per minute metric to detect an activity of the animal when the animal is neither within visible or audible range of the user. For example, the bark per minute metric may indicate the vocalizing of a dog at bay.

Figure 31:
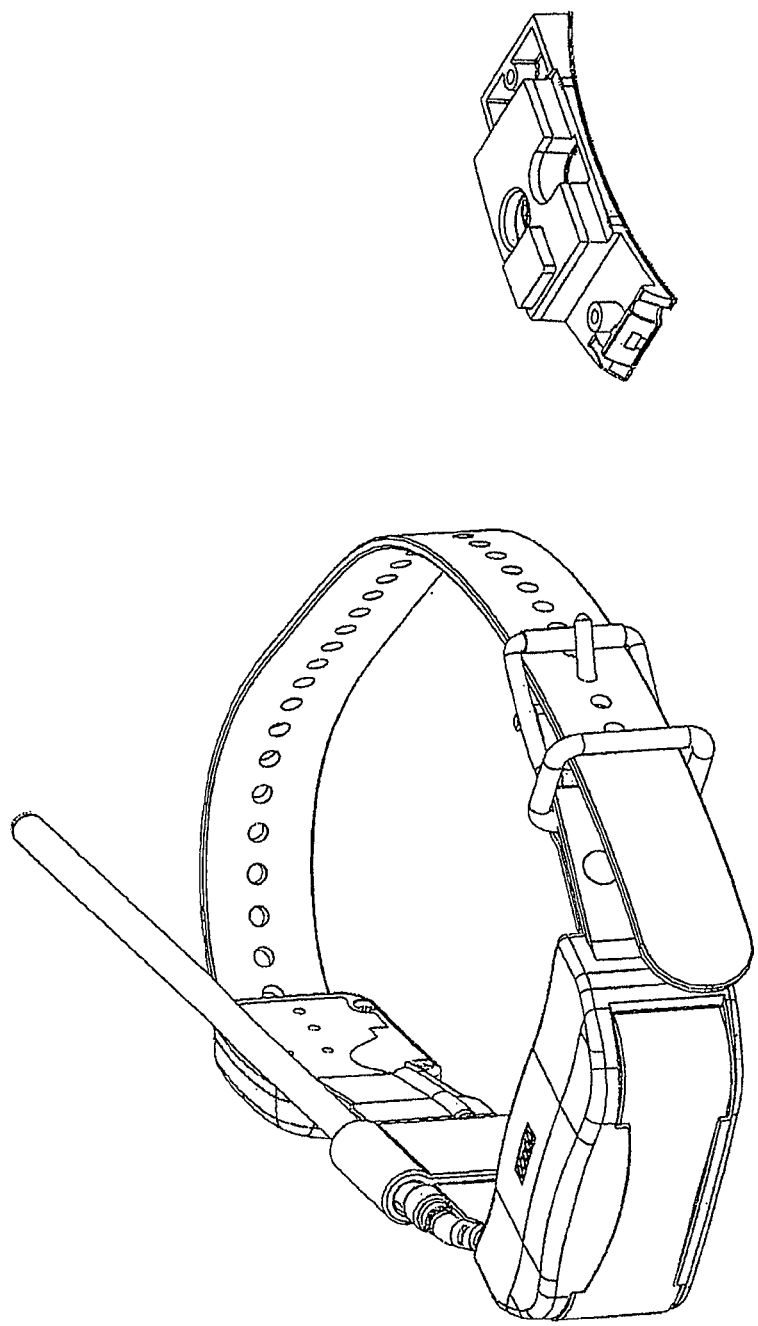
FIG. 31 shows the integrated GPS tracking/E-collar system, under an embodiment.
Figure 32:
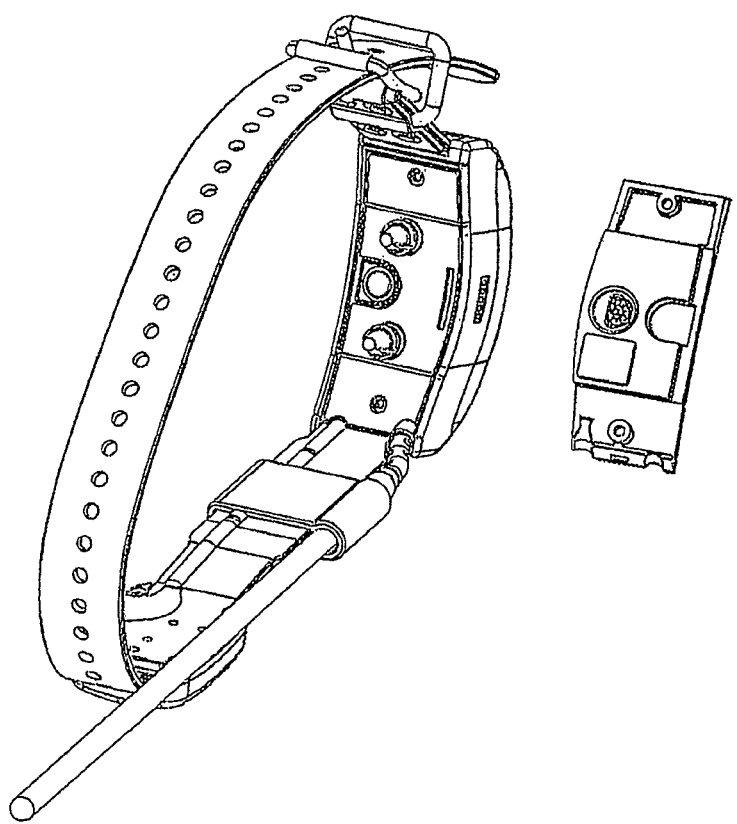
FIG. 32 shows the integrated GPS tracking/E-collar system, under an embodiment.
Figure 33:
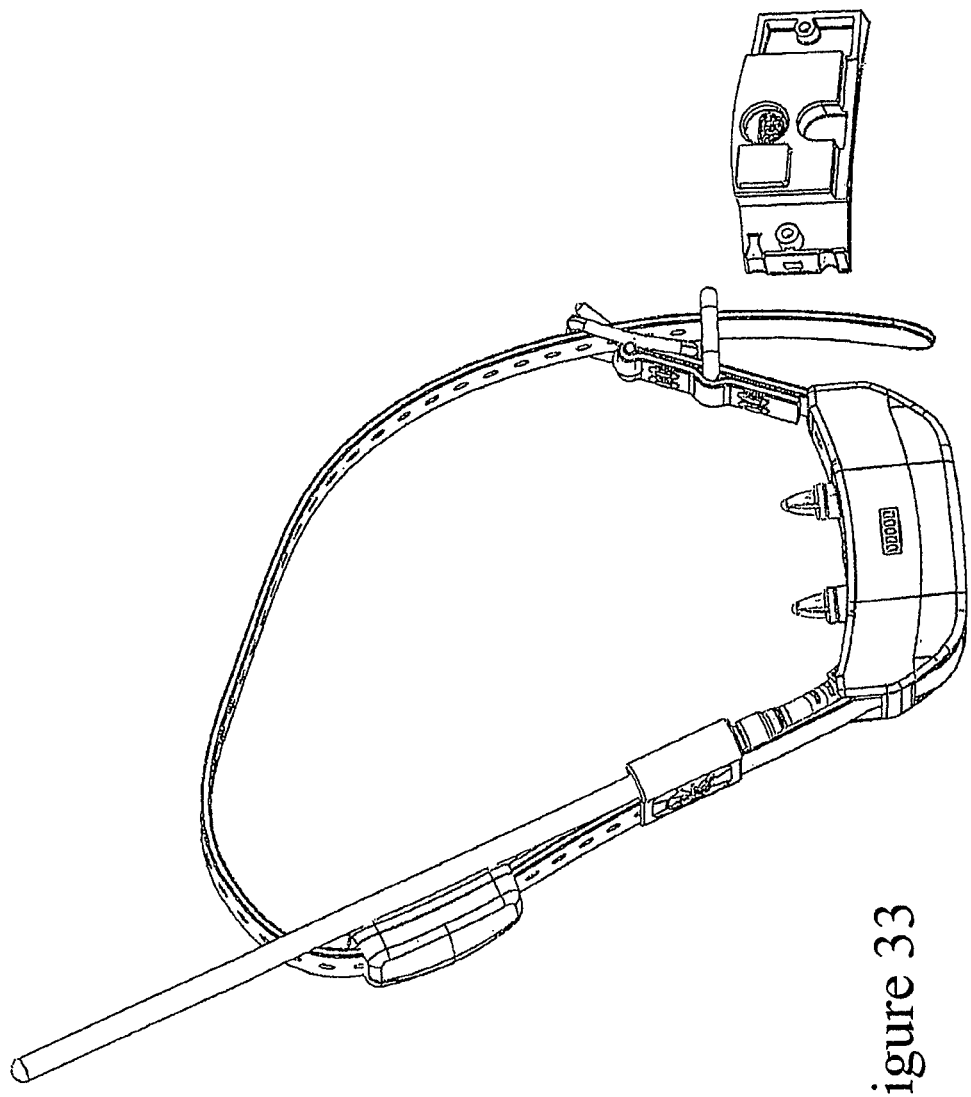
FIG. 33 shows the integrated GPS tracking/E-collar system, under an embodiment.

FIGS. 31-33 show the integrated GPS tracking/E-collar system under an embodiment. Note that FIGS. 31-33 show the integrated system attached to a collar which may then be used to mount the system onto an animal. Further, such figures show an example of a decoupled E-collar unit next to each integrated GPS tracking/E-collar system.

According to various embodiments of the present general inventive concept, an animal tracking and control system and apparatus (also referred to as a GPS tracking/E-collar system and apparatus under an alternative embodiment) provides a user with an animal tracking, animal training, or animal tracking/training system that can be user configured. In any of a number of example configurations, there is only one collar (or other animal encircling device) mounted device which is provided to the animal, and only one control device to control the mounted device. The control device may be a remote handheld control unit. Such an apparatus and system greatly simplifies the mounting and operation of an animal training and/or tracking system. Such an apparatus and system also benefits the animal provided with the tracking and control apparatus, due to reduced bulk and weight resulting from not having to wear two separate devices with two separate securing members.

Figure 34:
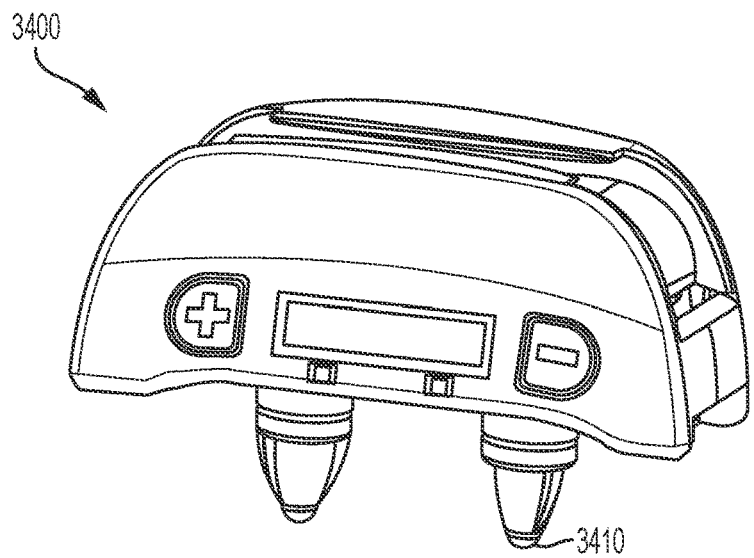
FIG. 34 shows a perspective view of a bark collar unit, under an embodiment.
Figure 35:
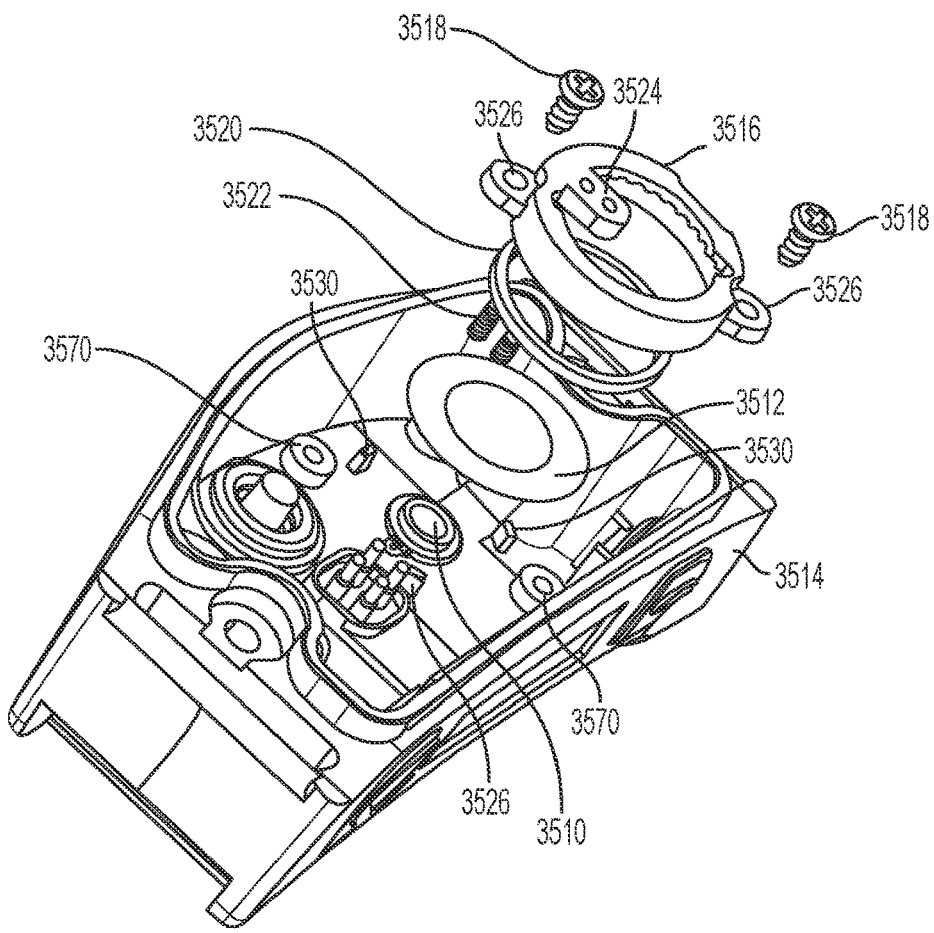
FIG. 35 shows in exploded view the components of a piezoelectric coupling, under an embodiment.

FIG. 34 shows a perspective view of a bark collar or bark collar unit 3400 under an embodiment. FIG. 34 shows metal electrode probe 3410 which is analogous to metal probes 208 as shown in FIGS. 23A and 23B. Under the embodiment shown in FIG. 34, metal electrode probe 3410 is configured to contact a skin surface of an animal wearing the bark collar unit 3400 and to detect vibrations generated by the animal's barking. Under this embodiment, a piezoelectric coupling located within the bark collar (as shown in FIGS. 35 and 36) facilitates the bark collar's detection of barking events.

Note that the bark collar 3400 may comprise an integrated GPS tracking/E-collar system as described above with respect to FIGS. 19-33. Under this embodiment, tracking and stimulation units comprise discrete units and are removably coupled together. However, the bark collar may comprise a single collar component including metal electrode probes 3410. This single collar component and corresponding circuitry may be dedicated solely to bark detection and stimulus delivery. Under this embodiment, the bark collar may use a piezoelectric coupling mechanism for monitoring and detecting metal electrode probe signals as further described below.

Figure 36:
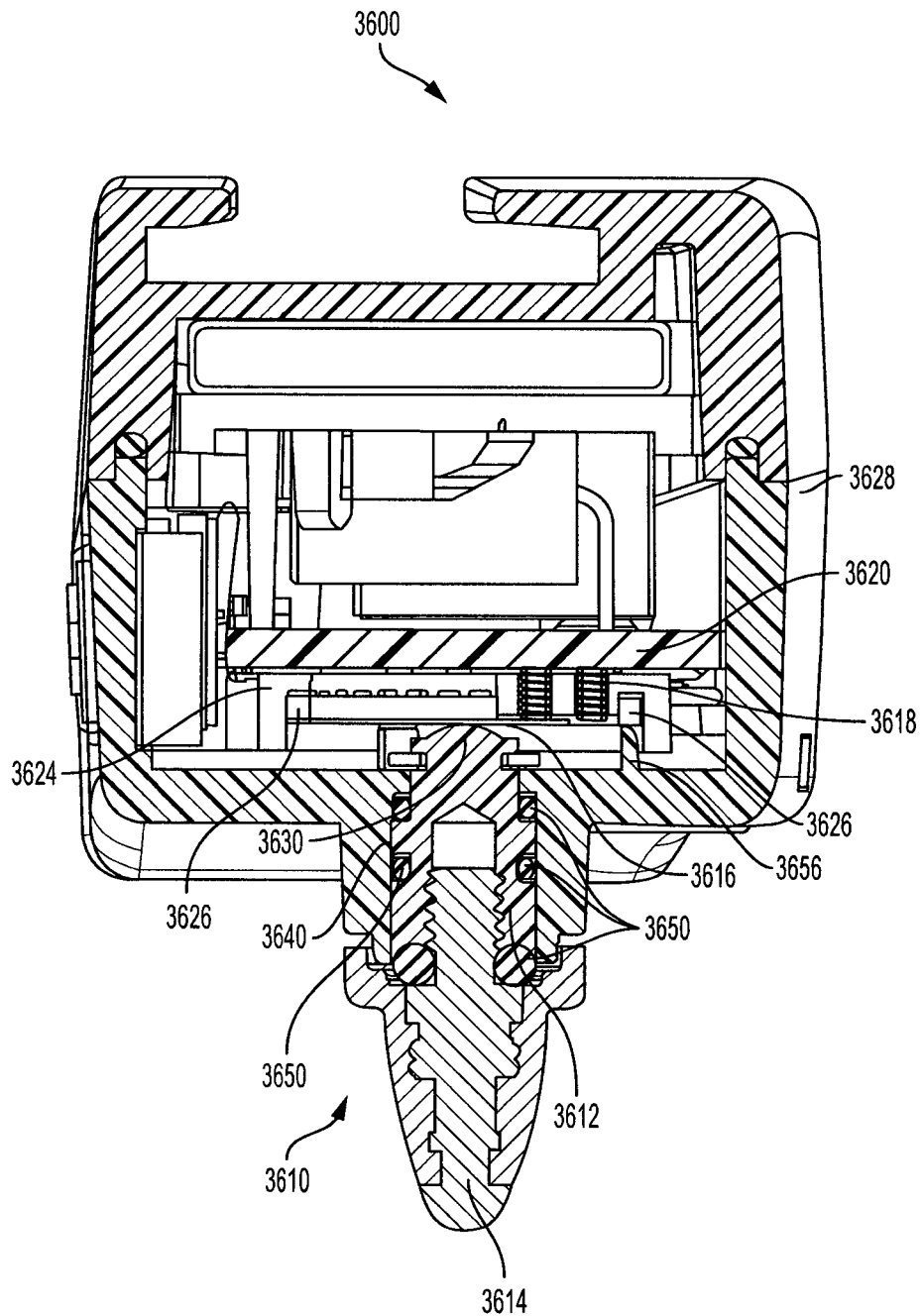
FIG. 36 shows a side view of a bark collar unit, under an embodiment.

FIG. 36 shows a side view of a bark collar unit 3600 under an embodiment. Metal electrode probe 3410 of FIG. 34 corresponds to metallic electrode probe 3610 of FIG. 36. As seen in FIG. 36, metal electrode probe 3610 comprises a metal electrode probe tip 3614 and a metallic electrode probe insert 3612. The bark collar enclosure 3628 receives the metal electrode probe insert 3612 in a receiving or mating cavity 3640. The metal electrode probe tip 3614 is threadably secured to the metal electrode probe insert 3612. The metal electrode probe insert 3612 comprises an upper surface 3630. This upper surface 3630 corresponds to the electrode probe contact surface 3510 as shown in FIG. 35.

Continuing with reference to FIG. 36, the enclosure 3628 of the bark collar includes a receiving cavity 3640 for receiving the metal electrode probe 3610. As indicated above, the metal electrode probe 3610 may comprise a metal electrode probe tip 3614 and a metal electrode probe insert 3612. The metal electrode probe is mated with the receiving cavity 3640 as seen in FIG. 36. Three elastomeric rings 3650 encircle the metal electrode probe and isolate it from the receiving cavity. Under one embodiment, the elastomeric rings are removable. Under another embodiment, the elastomeric rings are over-molded onto the metal electrode probe. These three rings provide the isolation under an embodiment.

FIG. 35 shows in exploded view the components of a piezoelectric coupling as positioned within an enclosure 3514 of a bark collar under an embodiment. FIG. 35 shows piezo bender retaining screws 3518, a piezo bender retainer 3516, a piezo bender spacer 3520, electrical contacts 3522, a piezo bender 3512, and metal electrode probe 3510.

Under an embodiment, the components of the piezoelectric coupling are dimensioned to collapse into a secured state (as further described below with respect to FIG. 36). Continuing with reference to FIG. 35, the piezo bender retainer 3516 comprises an inwardly projecting rim around its upper inner periphery. The piezo bender retainer 3516 also includes an inwardly projecting flange component 3524. The flange component 3524 comprises two openings for receiving and positioning the electrical contacts as further described below.

It can be seen with reference to FIG. 35 that the outer diameter of the piezo bender spacer 3520 is approximately equal to the interior diameter of the piezo bender retainer 3516. The diameter of the piezo bender 3512 is in turn approximately equal to the outer diameter of the piezo bender spacer 3520.

The retaining screws 3518 pass through openings in component 3526, under an embodiment. The floor of the bark collar enclosure 3514 includes screw bosses 3570 positioned to receive piezo bender retaining screws 3518. The floor of the bark collar enclosure 3514 also comprises three retaining feet 3530 under an embodiment. The retaining feet are positioned to secure and support the piezo bender 3512 as further described below.

FIG. 36 is a side view of the bark collar unit 3600 and shows the components of a piezo bender coupling in a secured state. The retaining screws 3518 pass through openings 3526 of the piezo bender retainer 3516 and are secured to corresponding screw bosses 3570 in the floor of the bark collar enclosure. In such state, the piezo bender spacer 3520, 3626 fits within the piezo bender retainer 3516, 3624 with the outer surface of the piezo bender spacer 3520, 3626 adjacent the inner surface of retainer 3516, 3624 and with an upper surface of the piezo bender spacer 3520, 3626 adjacent a lower surface of the retainer's (3516, 3624) inwardly projecting retainer rim.

A lower surface of the piezo bender spacer 3520, 3626 contacts the outer peripheral surface of the piezo bender 3512, 3616 and presses the piezo bender onto the retaining feet 3530, 3656. In the secured state, a lower surface of the piezo bender (not shown) is pressably secured to and in direct contact with metal electrode probe contact surface 3510, 3630. Further, electrical contacts 3522, 3618 are in direct contact with an upper surface of piezo bender 3512, 3616. The openings in flange component 3524 both position and receive the electrical contacts 3522, 3618. The electrical contacts may comprise a spring. A secured state of the piezoelectric coupling may under an embodiment bias the spring with one end in contact with the piezo bender 3512, 3616 and the other end in contact with a printed circuit board 3620 of the bark collar's electrical system.

The piezoelectric coupling described above enhances the accuracy and ability of a bark collar unit to prevent, discourage and/or to eliminate the occurrence or frequency of a bark. The piezoelectric coupling comprises a piezo bender which is coupled to a mechanically isolated metal electrode probe which is inserted into the enclosure of the bark collar and makes physical contact to the dog's neck when the bark collar is fastened around the dog's neck with a collar.

When a dog wearing this dog collar barks, the neck vibration generated by the bark is transferred from the dog's neck to one end of the metal electrode probe and again transferred through the metal electrode probe into a piezo bender which is in physical contact with the other end of the metal electrode probe.

As indicated above, elastomeric rings encircle the metal electrode probe and isolate it from the receiving cavity of the bark collar. Due to the mechanical isolation between the metal electrode probe and mating enclosure of the bark collar, the metal electrode probe is free to vibrate with little dampening from the mating housing. The isolated configuration, i.e. the isolation between the metal electrode probe and mating enclosure, operates to prevent an exchange of energy from the mating enclosure to the metal electrode probe. This isolation configuration provides a freedom of vibration across the metal electrode probe and minimizes spurious signals originating from excitation of the mating enclosure. This vibration freedom increases the sensitivity and magnitude of the vibration which is transferred from the dog's neck to the piezo bender. The intent of the "mechanical isolation" is to prevent mechanical energy applied to the mating enclosure from being seen by the piezo bender. The goal is to ensure only mechanical energy applied to the probe is seen by the piezo bender. This reduces potential false bark signal detection and wake up events, which extend the battery life of the product.

Once the vibration of the dog's bark is transferred from the dog's neck, through the mechanically isolated metal electrode probe, and into the piezo bender, the piezo bender vibrates in response. This piezo bender vibration generates an electrical signal proportional to the frequency and magnitude of the coupled physical vibration and can be fed into an electrical system of a bark collar for processing.

The piezoelectric effect is the ability of certain materials to generate an electric charge in response to applied mechanical stress. One of the unique characteristics of the piezoelectric effect is that it is reversible, meaning that materials exhibiting the direct piezoelectric effect (the generation of electricity when stress is applied) also exhibit the converse piezoelectric effect (the generation of stress when an electric field is applied).

When piezoelectric material is placed under mechanical stress, a shifting of the positive and negative charge centers in the material takes place, which then results in an external electrical field. When reversed, an outer electrical field either stretches or compresses the piezoelectric material.

The piezoelectric effect is useful within applications that involve the production and detection of sound, generation of high voltages, and electronic frequency generation. As described above, the piezoelectric effect is critical to operation of the piezoelectric coupling.

As indicated above, the vibration of the dog's bark is transferred from the dog's neck through the mechanically isolated metal electrode probe, and into the piezo bender thereby causing the piezo bender to vibrate in response. This piezo bender vibration generates an electrical signal proportional to the frequency and magnitude of the coupled physical vibration. The electrical system of the bark collar may include digital or analog signal processing components for detecting the occurrence of frequencies and/or magnitude values which correspond to bark events. The electrically equivalent signal created by the excitation of the piezo bender to mechanical energy is processed through a series of three analog operational amplifier stages. Stage one provides buffering and a ~160 Hz high pass filter. The buffer provides a high impedance input to match the high impedance output of the piezo bender. The filter eliminates low frequency content of the signals that are primarily created from (non-bark) movement and flexure that is picked up while the collar is worn. Stage two provides unity gain with variable attenuation that is updated and controlled by the bark detection algorithm firmware. If the signal is found to be very large in magnitude (using most of the dynamic range of the ADC (Analog to Digital Convertor)) the signal is attenuated in the second stage in an attempt to prevent clipping of the signal (a condition in which the input signal exceeds the dynamic range of the ADC). The third stage is a fixed gain stage to increase the overall signal to optimally conform to the electrical limits of the ADC with no attenuation from stage 2. The overall set point for the gain is a function of both the mechanical and electrical characteristics of the entire system. Finally, the conditioned signals from the three stage operational amplifier AFE (analog front end) are converted to a digital equivalent by using an ADC which is used by the bark detection algorithm for bark event detection.

Based on the outcome of the signal processing, the decision on whether or not to emit a correctional output to the dog is made. Correctional outputs may include but would not be limited to an electrical stimulation, vibration, sound, or spray. Under one embodiment, a bark collar unit may comprise a user selectable switch that varies the level of applied electrical stimulus. A physical switch may allow user to select between various circuit resistor values and/or circuit networks which vary the current supplied to electrodes and/or the on time of the current (as controlled by pulse width modulation).

The bark control unit under the embodiment described above uses a single piezoelectric detection transducer to detect bark event signals. Under an alternative embodiment, a bark control unit may use two different bark detection transducers. The first transducer comprises a standard omni-directional microphone and the second transducer comprises a piezoelectric element. During a bark event, the signal from the piezoelectric transducer is used to wake the microprocessor of the bark control unit from a low power state. In turn, the remaining bark event waveform is analyzed using the microphone. The dual detection ensures that the bark in question originated from the dog wearing the collar and not another dog in close proximity. The algorithm used by the microprocessor focuses primarily on the attack envelope characteristics of the acoustical waveform to identify or reject an event as a valid bark. The attack characteristic comprises the time it takes for the waveform signal to proceed from zero or silence to the peak amplitude.

The embodiment of the bark control unit otherwise described above achieves a higher level of signal fidelity using only a piezoelectric detection element. The piezoelectric detection described above improves the mechanical coupling between source of the bark event and detection circuitry of the bark control unit. The piezoelectric detection described above operates to reduce and/or eliminate filtering or dampening of the bark signal.

The algorithm for bark detection with respect to the piezoelectric detection embodiment described above analyzes the whole waveform to accept or reject the event as a bark. This improves both bark detection and false (non-bark) rejection.

The bark detection algorithm samples the signals from the ADC. A number of criteria are included as part of this method of discrimination. The algorithm works to positively detect a bark event on the basis of not being rejected by the following criteria:

Too Few Timeslots—This indicates a short duration event such as a strike, a bump, or a quick scratch or scrape. The bark detection algorithm identifies these events and aborts as quickly as possible in order to conserve battery charge. On the other hand, if an early abort does not occur due to a short duration event, then a single trigger event can cause an increment of more than one (possibly several) of the abort causes listed below. That is, a possible bark can fail the bark validation for more than one reason.

Abort Unsaturated Timeslots—This means that the signal amplitude was too high. Too many time slots were saturated; meaning there were too few unsaturated timeslots to properly analyze the signal for a bark. When used in conjunction with the hardware attenuation (stage 2) automatic gain control very few of these aborts should occur since it results in a decrease in the overall gain.

Abort Amplitude—This means that too few timeslots met the minimum amplitude requirement.

Abort Piezo Minimum Ratio and Abort Piezo Median Ratio—These indicate that the signal had features that made it look more like a scratch or a scrape than a real bark. These tests look at the ratio of the signal's absolute average voltage to its peak-to-peak voltage in each timeslot. Under one embodiment a single finding of a low ratio in one timeslot is enough to categorize the signal as a non-bark event. Real barks tend to have a higher ratio than scrapes and scratches, because real barks are produced by relatively soft tissue compared to the hard plastic of the enclosure.

Abort Piezo Low Pass Minimum Ratio and Abort Piezo Low Pass Median Ratio—These are very similar to the Abort Piezo Minimum Ratio and Abort Piezo Median Ratio, except that we first low pass filter the signal in firmware before we calculate the ratio of the absolute average voltage to the peak-to-peak voltage.

Abort Piezo Spike Ratio—This indicates that the peak-to-peak amplitude of the signal in one or more timeslots exceeded the average peak-to-peak amplitude of its two neighboring timeslots by a factor of >1.75. That means that there was at least one spike in the data, and spikes of that high an amplitude are uncharacteristic of a real bark. (Real barks usually score below 1.30).

Abort Piezo Absolute Spike Ratio—This indicates that the absolute average amplitude of the signal in one or more timeslots exceeded the absolute average amplitude of its two neighboring timeslots by a factor of >1.75. That means that there was at least one spike in the data, and spikes of that high an amplitude are uncharacteristic of a real bark. (Real barks usually score below 1.30)

Not that the same bark detection method described above may be used across a family of bark detection collars that deliver varying forms of stimulus upon detection of a bark event. In other words, bark collar units may use the same bark detection method described above irrespective of whether the bark collar unit (i) delivers stimulus via electrical probes, (ii) delivers spray stimulus, (iii) delivers stimulus via ultrasonic blast, or (iv) delivers stimulus in the form of vibration.

Historically, bark detection has used positive logic. That is, software (implementing audio signal processing through analog or digital signal processing methods) would test an arbitrary waveform and if the criteria by which the waveform is evaluated is met (was true), a correction would be invoked, with the implication that the event is a bark.

The new approach for detection described herein uses negative logic. Each waveform is evaluated by a series of "tests" to prove that the waveform is not a bark. Furthermore, multiple tests have been created to allow greater discrimination of an arbitrary waveform. If the first test is true (i.e., if first test criteria are met indicating that the waveform is not a bark) then the negative logic process may abort. However, if the first test criteria are not met, then negative logic suggests that the waveform may be a bark. The waveform is then reevaluated by the next negative logic test. If the waveform passes through all of the tests (i.e. failing to meet test criteria), the implication is that the event was a bark. These additional tests allow greater discrimination of an event from previous designs to improve the confidence in the waveform identification since each additional test reinforces the negative logic and thus further provides that the waveform is a bark at the conclusion of all waveform test criteria.

In addition to the improved confidence in the detection algorithm, negative logic minimizes power. The order of the negative logic test criteria was chosen in such a way such that the most frequently created non-bark waveforms (those created by bumps, strikes, impacts, etc.) would be detected first (aborting any further checks for that waveform) and the unit quickly returns to a low power state.

The bark detection unit may include user selectable sensitivity ranges. The different sensitivity settings change the levels of specific negative logic tests which in turn, result in either a broader range of waveforms in which a correction will be triggered or a narrower range.

The bark detection unit can identify other dog vocalizations (whining, whimpering, moaning) to be detected/corrected in addition to barks.

The ratios and tests set forth above are applied to a waveform (potential bark event) using negative logic. The application of method allows for multiple testing criteria to be conducted and sequenced in such a way so as to maximize battery life. For example, the criteria of [176] has been found to be associated with an impact of the enclosure (a frequent non-bark event) and is selected as the first negative logic test.

The use of ratios and test as set forth above further allows the algorithm to extend its detection capabilities to include whines, whimpering and moans in addition to barks.

The use of ratios and tests as set forth above allows for fixed limits to be set while using a variable gain system. Without the use of ratios the limits would need to be modified every time the gain of the AFE (Acoustic Front End) is changed.

A user may, through the display and the user interface, change the limits of the detection criteria (set forth in the ratios and tests above), thus making a change that includes, but is not limited to, the detection performance, selectivity and sensitivity of the bark detection algorithm.

The concepts and techniques disclosed herein are not limited to the tracking and control of animals, and could be applied to various other applications and objects, without departing from the scope and spirit of the present general inventive concept. For example, although the description discusses a dog collar worn by a dog, the present general inventive concept is not limited to any particular type of animal, and further may be used by a human or mechanical mobile subject.

Figure 37:
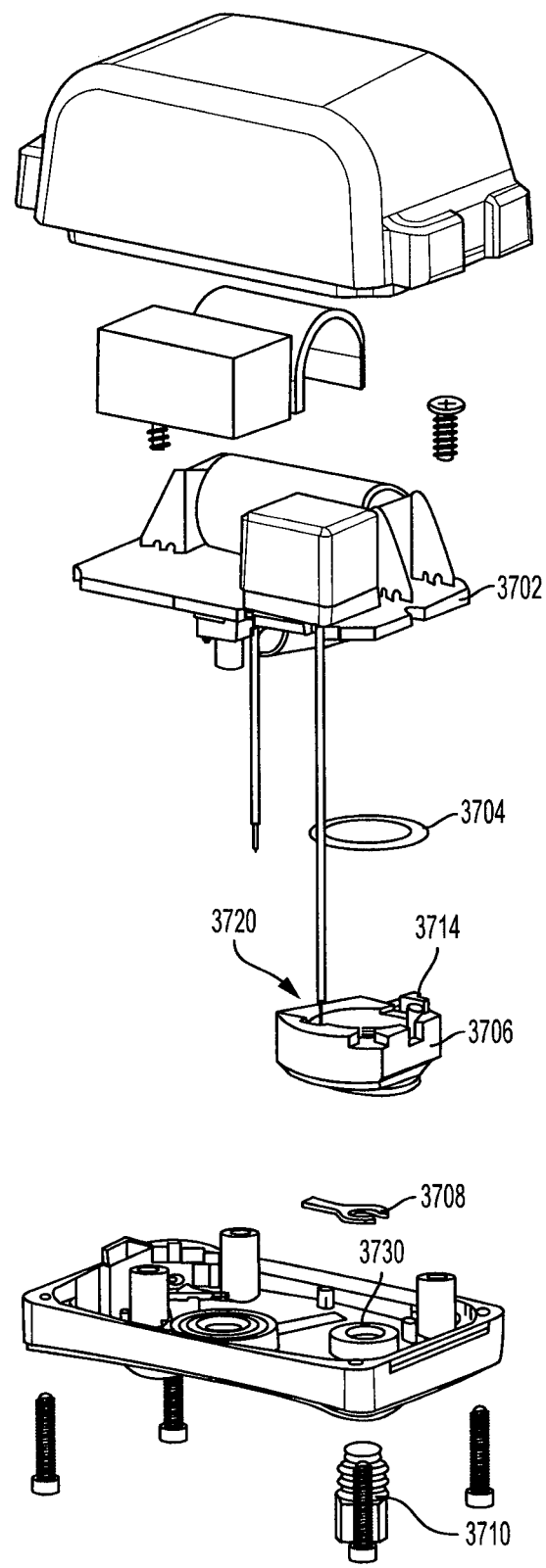
FIG. 37 shows an exploded view of a bark collar sensor mounting, under an embodiment.

FIG. 37 shows a bark collar sensor mounting under an embodiment. The exploded view of FIG. 37 shows a printed circuit board assembly (PCBA) 3702. The PCBA receives electrical signals from the piezoelectric vibration sensor. FIG. 37 also displays the piezo 3704 that is used as the vibration sensor. FIG. 37 shows a grommet component 3706 that captures the piezoelectric sensor with an undercut configuration. The grommet component locates the piezo directly to an underside of the PCBA. The grommet component also locates to another featured shape on the housing as seen in FIG. 37 (3730) and FIG. 38 (3806). An eclip 3708 receives (and captures) the probe insert 3710 as further shown in FIG. 38.

Figure 38:
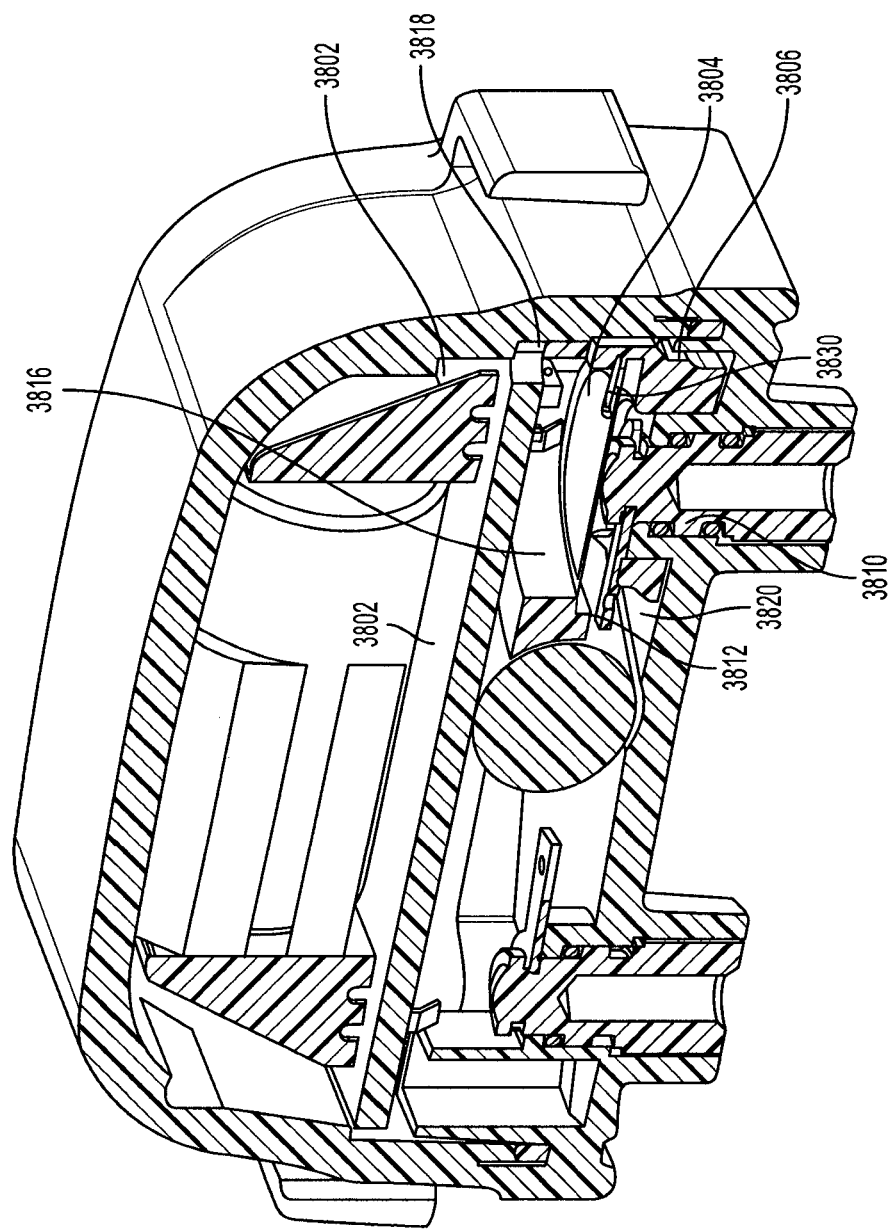
FIG. 38 shows a cross sectional view of a bark collar sensor mounting, under an embodiment.

FIG. 38 shows a cross sectional view of a bark collar sensor mounting under an embodiment. FIG. 38 shows a location of the printed circuit board 3802. A grommet 3816 fits directly to PCBA for vertical location of the piezo in stackup configuration 3818. The grommet 3816 features a protrusion element 3714 (as seen in FIG. 37) configured to contact or reside directly adjacent the PCBA surface without disturbing PCBA components. Accordingly, the protrusion element 3714 may assume various configurations to accommodate varying PCBA surface configurations or alternative contact locations.

The piezoelectric sensor 3804 fits within the grommet. Under one embodiment, the piezoelectric sensor enters the grommet through an opening on side 3720 of the grommet. The opening is not seen in FIG. 37; however the opening 3820 is readily visible in FIG. 38. The outer periphery of the piezoelectric element resides immediately adjacent an undercut lip of the grommet as seen in FIG. 38. The flexible grommet holder 3816 provides a constant force on the piezo to ensure contact between the piezoelectric sensor and the metal probe. The grommet 3816 (i.e., the undercut feature)

provides a slight interference fit 3812 with the piezoelectric sensor. As indicated above, the grommet locates on a feature of the plastic housing 3806. Here the lower portion of the grommet mates with an upwardly extending annular feature 3730. FIG. 38 shows a probe insert section 3810 of metal electrode probe. The probe insert comprises elastomeric rings to mechanically isolate the metal electrode probe, i.e. to isolate vibration and provide a hermetic seal. The piezo senses vibrations of the metal electrode probe and generates a corresponding electrical signal. The piezo connects to the PCBA via wire 3830. Accordingly, electrical signals generated by the piezo are communicated to the PCBA.

The apparatus described above with respect to FIGS. 35-36 features an isolated holder, rubber ring, and 2 screws which locate and hold the piezo into place. An alternative embodiment eliminates these screws and the holder and replaces these parts with the inherent shape of the molded flexible (rubber) grommet (shown in FIGS. 37 and 38). The grommet locates to the PCBA and a feature on the housing (as shown in FIG. 38). Screws which are used to fix the PCBA are also used to compress the rubber grommet.

Using a rubber grommet provides more compression distance and provides reduced likelihood that the stack-up causes an issue with intolerable force to the piezo (which could result in damage and reduced functional reliability).

Figure 39:
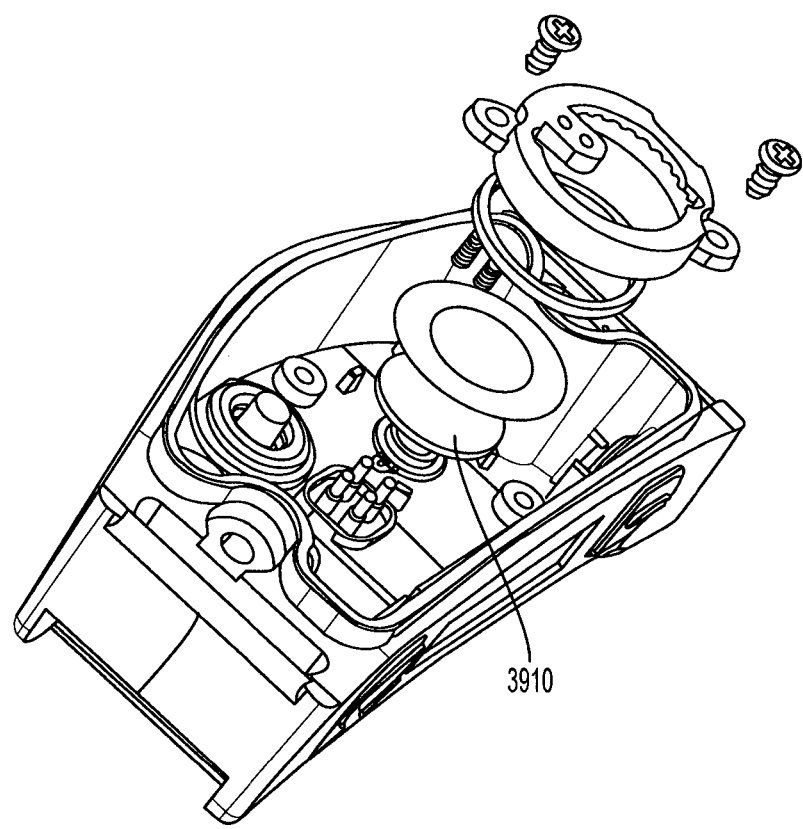
FIG. 39 shows in exploded view the components of a piezoelectric coupling, under an embodiment.
Figure 40:
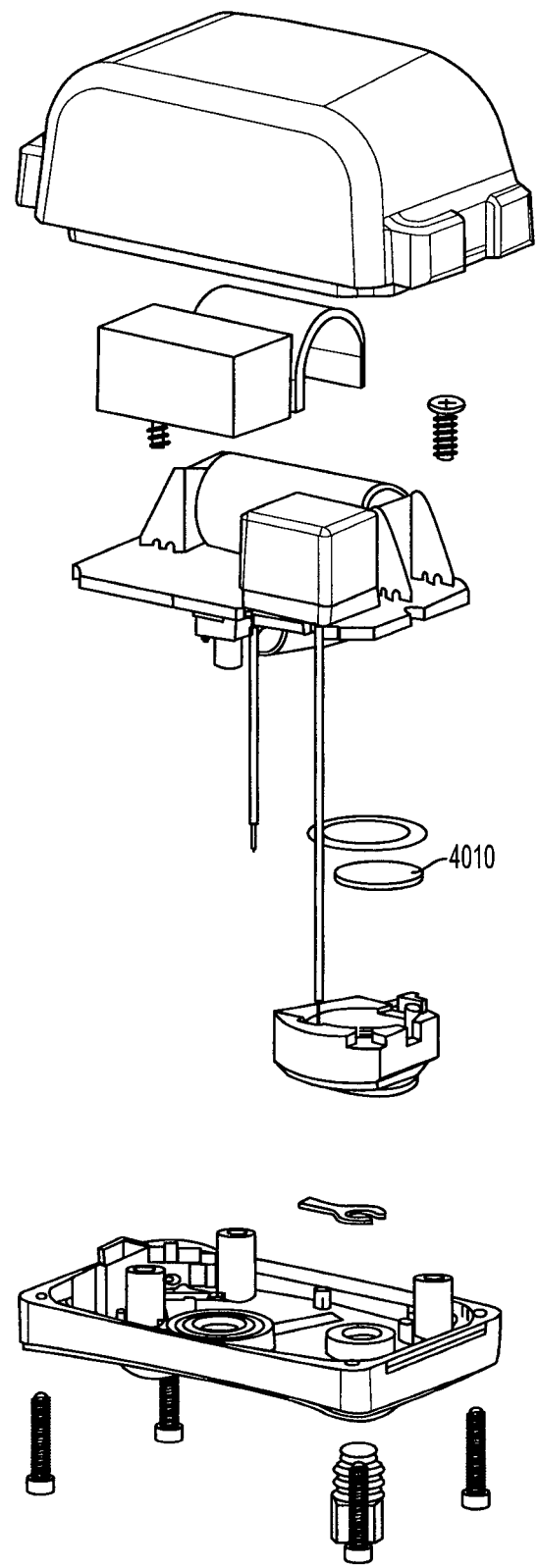
FIG. 40 shows an exploded view of a bark collar sensor mounting, under an embodiment.

FIG. 39 shows in exploded view the components of the piezoelectric coupling as seen in FIG. 35 with the addition of a damping element 3910, under an embodiment. One embodiment of the piezo electric coupling includes a dampening element on the underside of the piezo. The damping element may reside between the piezoelectric element and a surface of the metal electrode probe. Under this embodiment, this dampening element is in direct contact with a surface of the metal electrode probe. FIG. 40 shows in exploded view the components of a bark collar sensor mounting as seen in FIG. 37 with the addition of a damping element 4010, under an embodiment. The damping element may comprise Nomex™, under an embodiment.

Figure 41:
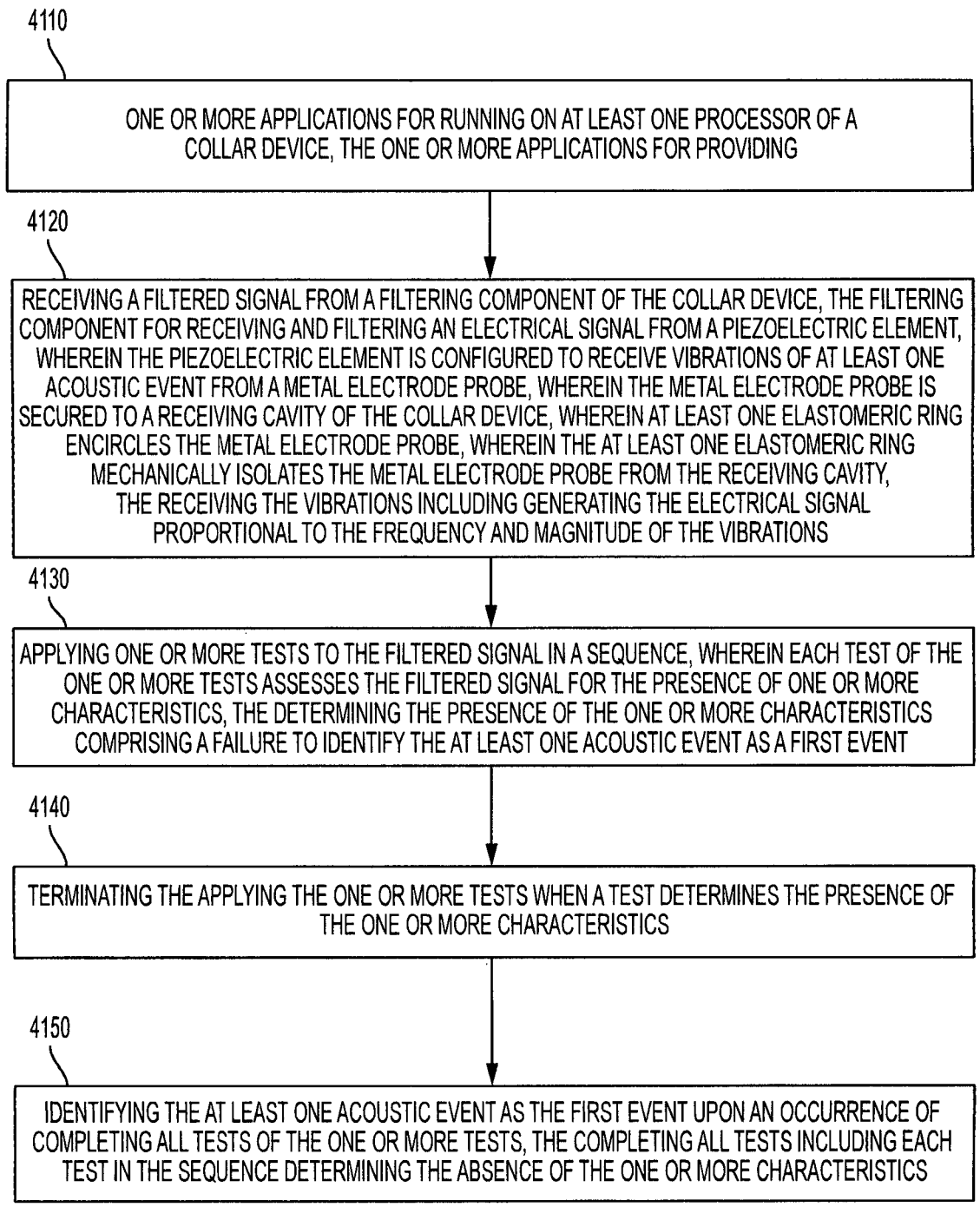
FIG. 41 shows a method for processing and identifying an acoustic event, under an embodiment.

FIG. 41 shows a method for processing and identifying an acoustic event, under an embodiment. The method includes 4110 one or more applications for running on at least one processor of a collar device, the one or more applications for providing the following steps. The method includes 4120 receiving a filtered signal from a filtering component of the collar device, the filtering component for receiving and filtering an electrical signal from a piezoelectric element, wherein the piezoelectric element is configured to receive vibrations of at least one acoustic event from a metal electrode probe, wherein the metal electrode probe is secured to a receiving cavity of the collar device, wherein at least one elastomeric ring encircles the metal electrode probe, wherein the at least one elastomeric ring mechanically isolates the metal electrode probe from the receiving cavity, the receiving the vibrations including generating the electrical signal proportional to the frequency and magnitude of the vibrations. The method includes 4130 applying one or more tests to the filtered signal in a sequence, wherein each test of the one or more tests assesses the filtered signal for the presence of one or more characteristics, the determining the presence of the one or more characteristics comprising a failure to identify the at least one acoustic event as a first event. The method includes 4140 terminating the applying the one or more tests when a test determines the presence of the one or more characteristics. The method includes identifying 4150 the at least one acoustic event as the first event upon an occurrence of completing all tests of the one or more tests, the completing all tests including each test in the sequence determining the absence of the one or more characteristics.

A collar unit device is described herein that comprises under an embodiment a receiving cavity. The collar unit device includes a metal electrode probe, wherein at least one elastomeric ring encircles the metal electrode probe, wherein the metal electrode probe comprises a first end and a second end. The collar unit device includes the receiving cavity for receiving the metal electrode probe, the receiving the metal electrode probe comprising securing the metal electrode probe to the collar unit device, wherein the at least one elastomeric ring mechanically isolates the metal electrode probe from the receiving cavity. The collar unit device includes the metal electrode probe for detecting vibrations of at least one acoustic event and transferring vibrations of the at least one acoustic event to a piezoelectric element. The collar unit device includes the piezoelectric element for receiving the vibrations of the least one acoustic event, the receiving the vibrations including generating an electrical signal proportional to the frequency and magnitude of the vibrations. The collar unit device includes at least one processor for receiving and processing the electrical signal.

The second end of the metal electrode probe is in contact with skin of an animal, under an embodiment.

The at least one acoustic event of an embodiment comprises at least one bark.

The isolating comprises minimizing damping of the vibrations by the receiving cavity, under an embodiment.

The isolating comprises preventing an exchange of energy from the receiving cavity to the metal electrode probe, under an embodiment.

The at least one elastomeric ring of an embodiment is removable.

The at least one elastomeric ring of an embodiment is over-molded onto the metal electrode probe.

The collar unit device comprises under an embodiment a retainer component for securing the piezoelectric element in a secured position, wherein the secured position comprises a surface of the piezoelectric element maintaining contact with the first end of the metal electrode probe, wherein the retainer component comprises a retainer and a spacer.

The retainer component of an embodiment comprises a damping element between the piezoelectric element and the first end of metal electrode probe, wherein the contact comprises the surface of the piezoelectric element in contact with the damping element, wherein the contact comprises the damping element in contact with the first end of the metal electrode probe.

The retainer of an embodiment comprises an inwardly projecting retainer rim and a plurality of outwardly projecting retaining components, wherein the outwardly projecting retaining components comprise retainer openings for receiving retainer screws.

An outer diameter of the spacer is approximately equal to an interior diameter of the retainer, under an embodiment.

The diameter of the piezoelectric element is approximately equal to an outer diameter of the spacer, under an embodiment.

The securing the piezoelectric element in the secured position comprises the retainer screws positioned through the retainer openings and threadably secured to screw bosses on an interior floor of the collar unit device, under an embodiment.

An outer circumferential surface of the spacer is adjacent an inner circumferential surface of the retainer in the secured position, under an embodiment.

An upper surface of the spacer is adjacent a lower surface of the inwardly projecting retainer rim in the secured position, under an embodiment.

A lower surface of the spacer contacts an outer peripheral surface of the piezoelectric element in the secured position, wherein the contacting includes pressing the piezoelectric element towards retaining feet positioned on the interior floor, under an embodiment.

The metal electrode probe of an embodiment includes a metal electrode probe insert and a metal electrode probe tip, wherein the metal electrode probe insert includes the first end, wherein the metal electrode probe tip includes the second end.

The receiving the metal electrode probe comprises securing the metal electrode probe insert to the collar unit device, under an embodiment.

The metal electrode probe of an embodiment tip is threadably attached to the metal electrode probe insert.

A collar unit device is described that comprises a receiving cavity for receiving a metal electrode probe, wherein at least one elastomeric ring encircles the metal electrode probe, wherein the at least one elastomeric ring mechanically isolates the metal electrode probe from the receiving cavity. The collar unit device includes a piezoelectric element. The collar unit device includes a retainer component for maintaining the piezoelectric element in a secured position, wherein the secured position comprises the retainer component urging a first surface of the piezoelectric element toward a second surface of the metal electrode probe, wherein the secured position comprises the first surface maintaining contact with the second surface. The collar unit device includes the metal electrode probe for detecting vibrations of one or more acoustic events and transferring the vibrations to the piezoelectric element through the contact. The collar unit device includes the piezoelectric element for receiving the vibrations of the one or more acoustic events, the receiving the vibrations including generating an electrical signal proportional to the frequency and magnitude of the vibrations. The collar unit device includes at least one processor for receiving and processing the electrical signal.

The retainer component of an embodiment comprises a damping element between the piezoelectric element and the metal electrode probe, wherein the contact comprises the first surface in contact with the damping element, wherein the contact comprises the damping element in contact with the second surface.

A method is described herein that includes one or more applications for running on at least one processor of a collar device, the one or more applications for providing the following steps. The method includes receiving a filtered signal from a filtering component of the collar device, the filtering component for receiving and filtering an electrical signal from a piezoelectric element, wherein the piezoelectric element is configured to receive vibrations of at least one acoustic event from a metal electrode probe, wherein the metal electrode probe is secured to a receiving cavity of the collar device, wherein at least one elastomeric ring encircles the metal electrode probe, wherein the at least one elastomeric ring mechanically isolates the metal electrode probe from the receiving cavity, the receiving the vibrations including generating the electrical signal proportional to the frequency and magnitude of the vibrations. The method includes applying one or more tests to the filtered signal in a sequence, wherein each test of the one or more tests assesses the filtered signal for the presence of one or more characteristics, the determining the presence of the one or more characteristics comprising a failure to identify the at least one acoustic event as a first event. The method includes terminating the applying the one or more tests when a test determines the presence of the one or more characteristics. The method includes identifying the at least one acoustic event as the first event upon an occurrence of completing all tests of the one or more tests, the completing all tests including each test in the sequence determining the absence of the one or more characteristics.

The assessing the filtered signal of an embodiment for the presence of the one or more characteristics includes the filtered signal comprising a number of timeslots falling below a threshold.

The assessing the filtered signal of an embodiment for the presence of the one or more characteristics includes the filtered signal comprising a signal amplitude that exceeds a threshold.

The assessing the filtered signal of an embodiment for the presence of the one or more characteristics includes the filtered signal comprising a number of timeslots meeting a minimum amplitude requirement falling below a threshold.

The assessing the filtered signal of an embodiment for the presence of the one or more characteristics comprises one or more timeslots of the filtered signal including a ratio of absolute average voltage to peak to peak voltage falling below a threshold.

The assessing the filtered signal of an embodiment comprises passing the filtered signal through a low pass filter to provide a low pass filtered signal, wherein the assessing the filtered signal for the presence of the one or more characteristics comprises one or more timeslots of the low pass filtered signal including a ratio of absolute average voltage to peak to peak voltage falling below a threshold.

The assessing the filtered signal of an embodiment for the presence of the one or more characteristics comprises the filtered signal comprising a peak-to-peak amplitude in one or more timeslots exceeding an average peak-to-peak amplitude of its two neighboring timeslots by a factor of at least 1.75.

The assessing the filtered signal of an embodiment for the presence of one or more characteristics comprises the filtered signal including an absolute average amplitude in one or more timeslots exceeding an absolute average amplitude of its two neighboring timeslots by a factor of at least 1.75.

The metal electrode probe of an embodiment is in contact with skin of an animal.

The first event of an embodiment comprises at least one bark.

The isolating of an embodiment comprises minimizing damping of the vibrations by the receiving cavity.

The isolating of an embodiment comprises preventing an exchange of energy from the receiving cavity to the metal electrode probe.

The at least one elastomeric ring of an embodiment is removable.

The at least one elastomeric ring of an embodiment is over-molded onto the metal electrode probe.

A securing component for securing the piezoelectric element in a secured position, wherein the secured position comprises a surface of the piezoelectric element maintaining contact with the metal electrode probe, under an embodiment.

The securing component of an embodiment comprises a damping element between the piezoelectric element and the metal electrode probe, wherein the contact comprises the surface of the piezoelectric element in contact with the damping element, wherein the contact comprises the damping element in contact with the metal electrode probe.

The receiving and filtering of an embodiment includes provides a high impedance input to match a high impedance output of the piezoelectric element and passing the electrical signal through a high pass filter.

The receiving and filtering of an embodiment comprises at least one of attenuating the electrical signal and applying gain to the electrical signal to match a range of an analog to digital converter.

The receiving and filtering of an embodiment comprises using the analog to digital converter to convert the electrical signal to a digital signal.

A collar unit device is described that comprises a receiving cavity. The collar unit device includes a metal electrode probe, wherein at least one elastomeric ring encircles the metal electrode probe, wherein the metal electrode probe comprises a first end and a second end. The collar unit device includes the receiving cavity for receiving the metal electrode probe, the receiving the metal electrode probe comprising securing the metal electrode probe to the collar unit device, wherein the at least one elastomeric ring mechanically isolates the metal electrode probe from the receiving cavity. The collar unit device includes the metal electrode probe for detecting vibrations of one or more acoustic events and transferring the vibrations of the one or more acoustic events to a piezoelectric element. The collar unit device includes a grommet component for positioning the piezoelectric element, the positioning including receiving the piezoelectric element in a securing feature of the grommet component, the positioning including an upper portion of the grommet component contacting a surface of a printed circuit board assembly, the positioning including a lower portion of the grommet component mating with a housing feature on an interior surface of the collar unit device, wherein the upper portion contacting the printed circuit board assembly and the lower portion mating with the housing feature comprises locating the grommet in a secured position. The collar unit device includes the grommet component in the secured position providing a force on the piezoelectric element to maintain contact between the piezoelectric element and the first end of the metal electrode probe. The collar unit device includes the piezoelectric element for receiving the vibrations of the one or more acoustic events, the receiving the vibrations including generating an electrical signal proportional to the frequency and magnitude of the vibrations. The collar unit device includes at least one processor located on the printed circuit board assembly for receiving and processing the electrical signal.

The receiving the piezoelectric element in the securing feature of the grommet component includes securing the piezoelectric element in the securing feature, under an embodiment.

The securing feature of an embodiment comprises an undercut feature.

The securing the piezoelectric element in the undercut feature of the grommet component including securing the piezoelectric element in the undercut feature in an interference fit, under an embodiment.

The housing feature of an embodiment comprises an upwardly extending annular feature.

The second end of the metal electrode probe is in contact with skin of an animal, under an embodiment.

The one or more acoustic events of an embodiment comprises at least one bark.

The isolating of an embodiment comprises minimizing damping of the vibrations by the receiving cavity.

The isolating of an embodiment comprises preventing an exchange of energy from the receiving cavity to the metal electrode probe.

The at least one elastomeric ring of an embodiment is removable.

The at least one elastomeric ring of an embodiment is over-molded onto the metal electrode probe.

The metal electrode probe of an embodiment includes a metal electrode probe insert and a metal electrode probe tip, wherein the metal electrode probe insert includes the first end, wherein the metal electrode probe tip includes the second end.

The receiving the metal electrode probe of an embodiment comprises securing the metal electrode probe insert to the collar unit device.

The metal electrode probe tip of an embodiment is threadably attached to the metal electrode probe insert.

An upper periphery of the first end comprises under an embodiment a recessed portion, the securing the metal electrode probe to the collar unit device comprising the recessed portion receiving a metal clip, wherein the metal clip captures the metal electrode probe within the receiving cavity.

A damping element of an embodiment is positioned between the piezoelectric element and the first end of metal electrode probe, wherein the contact comprises the surface of the piezoelectric element in contact with the damping element, wherein the contact comprises the damping element in contact with the first end of the metal electrode probe.

A collar unit is described herein that comprises a receiving cavity. The collar unit includes a metal electrode probe, wherein at least one elastomeric ring encircles the metal electrode probe. The collar unit includes the receiving cavity for receiving the metal electrode probe, the receiving the metal electrode probe comprising securing the metal electrode probe to the collar unit device, wherein the at least one elastomeric ring mechanically isolates the metal electrode probe from the receiving cavity. The collar unit includes the metal electrode probe for detecting vibrations of one or more acoustic events and transferring the vibrations of the one or more acoustic events to a piezoelectric element. The collar unit includes a grommet component for positioning the piezoelectric element, the positioning including receiving the piezoelectric element in a securing feature of the grommet, the positioning including an upper portion of the grommet component contacting a surface of a printed circuit board assembly, the positioning including a lower portion of the grommet component connecting with a housing feature on an interior surface of the collar unit device, wherein the upper potion contacting the printed circuit board assembly and the lower portion connecting with the housing feature comprises locating the grommet in a secured position. The collar unit includes the grommet component in the secured position urging a first surface of the piezoelectric element toward a second surface of the metal electrode probe, wherein the secured position comprises the first surface maintaining contact with the second surface. The collar unit includes the piezoelectric element for receiving the vibrations of the one or more acoustic events, the receiving the vibrations including generating an electrical signal proportional to the frequency and magnitude of the vibrations. The collar unit includes at least one processor located on the printed circuit board assembly for receiving and processing the electrical signal.

The collar unit includes of an embodiment comprises a damping element positioned between the piezoelectric element and the metal electrode probe, wherein the contact comprises the first surface in contact with the damping element, wherein the contact comprises the damping element in contact with the second surface.

While the present general inventive concept has been illustrated by description of several example embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

Each patent, patent application, and/or publication mentioned in this specification is herein incorporated by reference in its entirety to the same extent as if each individual patent, patent application, and/or publication was specifically and individually indicated to be incorporated by reference.

The invention claimed is:

1. A collar unit device comprising:
a receiving cavity of a collar unit device enclosure;
a metal electrode probe, wherein at least one elastomeric ring encircles the metal electrode probe, wherein the metal electrode probe comprises a first end and a second end;
the receiving cavity for receiving the metal electrode probe, the receiving the metal electrode probe comprising securing the metal electrode probe to the collar unit device, wherein the at least one elastomeric ring mechanically isolates the metal electrode probe from the receiving cavity;
the metal electrode probe for detecting vibrations of at least one acoustic event and transferring vibrations of the at least one acoustic event to a piezoelectric element located within the collar unit device enclosure;
the piezoelectric element for receiving the vibrations of the least one acoustic event, the receiving the vibrations including generating an electrical signal proportional to the frequency and magnitude of the vibrations;
a retainer component located within the collar unit device enclosure for securing the piezoelectric element in a secured position, wherein the second position comprises the retainer component encircling, and surrounding the piezoelectric element, wherein the secured position comprises the retainer component trapping the piezoelectric element between a spacer and the first end of the metal electrode probe, wherein the secured position comprises an opening of the retainer component locating and maintaining a conductive element in a fixed position, wherein the fixed position comprises the conductive element contacting the piezoelectric element, wherein the conductive element provides electrical communication between the piezoelectric element and at least one processor of the collar unit device;
the at least one processor for receiving and processing the electrical signal.

2. The collar unit device of claim 1, wherein the second end of the metal electrode probe is in contact with a skin of an animal.

3. The collar unit device of claim 1, wherein the at least one acoustic event comprises at least one bark.

4. The collar unit device of claim 1, the isolating comprising minimizing damping of the vibrations by the receiving cavity.

5. The collar unit device of claim 1, the isolating comprising preventing an exchange of energy from the receiving cavity to the metal electrode probe.

6. The collar unit device of claim 1, wherein the at least one elastomeric ring is removable.

7. The collar unit device of claim 1, wherein the at least one elastomeric ring is over-molded onto the metal electrode probe.

8. The collar unit device of claim 1, wherein the secured position comprises a surface of the piezoelectric element maintaining contact with the first end of the metal electrode probe.

9. The method of claim 8, wherein the retainer component comprises a damping element between the piezoelectric element and the first end of metal electrode probe, wherein the contact comprises the surface of the piezoelectric element in contact with the damping element, wherein the contact comprises the damping element in contact with the first end of the metal electrode probe.

10. The collar unit device of claim 8, wherein the retainer component comprises an inwardly projecting retainer rim and a plurality of outwardly projecting retaining components, wherein the outwardly projecting retaining components comprise retainer openings for receiving retainer screws.

11. The collar unit device of claim 10, wherein an outer diameter of the spacer is approximately equal to an interior diameter of the retainer component.

12. The collar unit device of claim 11, wherein the diameter of the piezoelectric element is approximately equal to an outer diameter of the spacer.

13. The collar unit device of claim 12, the securing the piezoelectric element in the secured position comprising the retainer screws positioned through the retainer openings and threadably secured to screw bosses on an interior floor of the collar unit device.

14. The collar unit device of claim 13, wherein an outer circumferential surface of the spacer is adjacent an inner circumferential surface of the retainer component in the secured position.

15. The collar unit device of claim 14, wherein an upper surface of the spacer is adjacent a lower surface of the inwardly projecting retainer rim in the secured position.

16. The collar unit device of claim 15, wherein a lower surface of the spacer contacts an outer peripheral surface of the piezoelectric element in the secured position, wherein the contacting includes pressing the piezoelectric element towards retaining feet positioned on the interior floor.

17. The collar unit device of claim 1, wherein the metal electrode probe includes a metal electrode probe insert and a metal electrode probe tip, wherein the metal electrode probe insert includes the first end, wherein the metal electrode probe tip includes the second end.

18. The collar unit device of claim 17, the receiving the metal electrode probe comprising securing the metal electrode probe insert to the collar unit device.

19. The collar unit device of claim 18, wherein the metal electrode probe tip is threadably attached to the metal electrode probe insert.

20. A collar unit device comprising,
a receiving cavity of a collar unit device enclosure for receiving a metal electrode probe, wherein at least one elastomeric ring encircles the metal electrode probe, wherein the at least one elastomeric ring mechanically isolates the metal electrode probe from the receiving cavity;

a piezoelectric element located within the collar unit device enclosure;

a retainer component located within the collar unit device enclosure for securing the piezoelectric element in a secured position, wherein the secured position comprises the retainer component encircling and surrounding the piezoelectric element, wherein the secured position comprises the retainer component trapping the piezoelectric element between a spacer and the metal electrode probe, wherein the secured position comprises the retainer component urging a first surface of the piezoelectric element toward a second surface of the metal electrode probe, wherein the secured position comprises the first surface maintaining contact with the second surface, wherein the secured position comprises an opening of the retainer component locating and maintaining a conductive element in a fixed position, wherein the fixed position comprises the conductive element contacting the piezoelectric element, wherein the conductive element provides electrical communication between the piezoelectric element and at least one processor of the collar unit device;

the metal electrode probe for detecting vibrations of one or more acoustic events and transferring the vibrations to the piezoelectric element through the contact;

the piezoelectric element for receiving the vibrations of the one or more acoustic events, the receiving the vibrations including generating an electrical signal proportional to the frequency and magnitude of the vibrations;

the at least one processor for receiving and processing the electrical signal.

21. The collar unit device of claim 20, wherein the retainer component comprises a damping element between the piezoelectric element and the metal electrode probe, wherein the contact comprises the first surface in contact with the damping element, wherein the contact comprises the damping element in contact with the second surface.

\* \* \* \* \*